United States Patent
Sanders

(10) Patent No.: US 9,410,477 B2
(45) Date of Patent: Aug. 9, 2016

(54) POWER DELIVERY DEVICES FOR RECIPROCATING ENGINES AND RELATED SYSTEMS AND METHODS

(71) Applicant: Nicholas A. Sanders, Enfield, NH (US)

(72) Inventor: Nicholas A. Sanders, Enfield, NH (US)

(73) Assignee: Enfield Engine Company, LLC, Enfield, NH (US)

( * ) Notice: Subject to any disclaimer, the term of this patent is extended or adjusted under 35 U.S.C. 154(b) by 0 days.

(21) Appl. No.: 14/294,977

(22) Filed: Jun. 3, 2014

(65) Prior Publication Data

US 2014/0352653 A1 Dec. 4, 2014

Related U.S. Application Data

(60) Provisional application No. 61/830,456, filed on Jun. 3, 2013.

(51) Int. Cl.
*F02B 75/32* (2006.01)
*F02B 75/04* (2006.01)
*F16C 3/06* (2006.01)

(52) U.S. Cl.
CPC .... *F02B 75/042* (2013.01); *F16C 3/06* (2013.01)

(58) Field of Classification Search
USPC ............... 123/197.5; 192/48.611, 48.614, 192/48.8–48.91
See application file for complete search history.

(56) References Cited

U.S. PATENT DOCUMENTS

| 4,433,649 A | 2/1984 | Shin |
| 5,934,243 A * | 8/1999 | Kopystanski ............ 123/197.1 |
| 2005/0217618 A1* | 10/2005 | Watanabe et al. ............ 123/78 F |
| 2006/0005793 A1* | 1/2006 | Ward .......................... 123/48 B |
| 2008/0223320 A1* | 9/2008 | Chepettchouk ............. 123/90.1 |
| 2011/0107998 A1* | 5/2011 | Xiong et al. ............... 123/197.4 |
| 2012/0312273 A1* | 12/2012 | Weverka ..................... 123/197.3 |

FOREIGN PATENT DOCUMENTS

| CN | 1800609 A | * 7/2006 |
| CN | 1928337 | 3/2007 |
| CN | 100419234 | 9/2008 |
| WO | 2008124816 | 10/2008 |

OTHER PUBLICATIONS

Machine Translation of CN1800609A PDF File Name: "CN1800609A_Machine_Translation.pdf".*
International Search Report and Written Opinion of the International Searching Authority issued from Korean Intellectual Property Office for related International Application No. PCT/US2014/040722, dated Sep. 23, 2014. 12 pages.

\* cited by examiner

*Primary Examiner* — Hung Q Nguyen
*Assistant Examiner* — Ruben Picon-Feliciano
(74) *Attorney, Agent, or Firm* — Proskauer Rose LLP

(57) ABSTRACT

In some aspects, a power delivery device configured to couple to a reciprocating element of a reciprocating engine is configured to couple to a power output element via a substantially steady, invariant (e.g., constant) moment arm in order to generate increased torque and power.

29 Claims, 16 Drawing Sheets

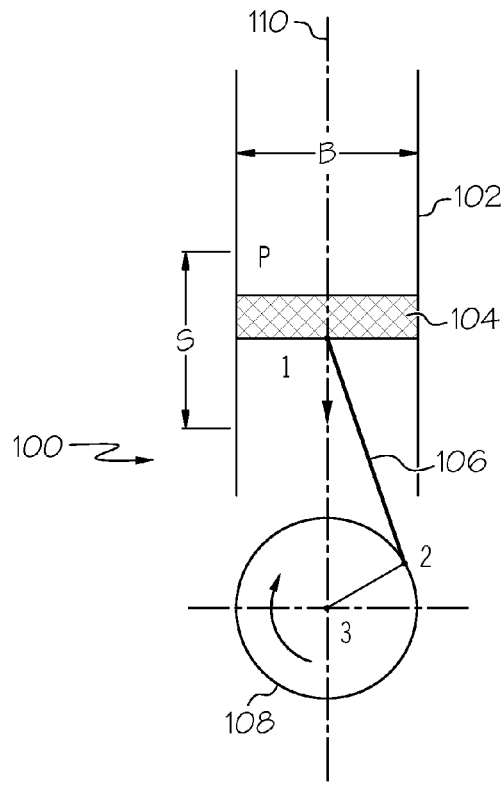
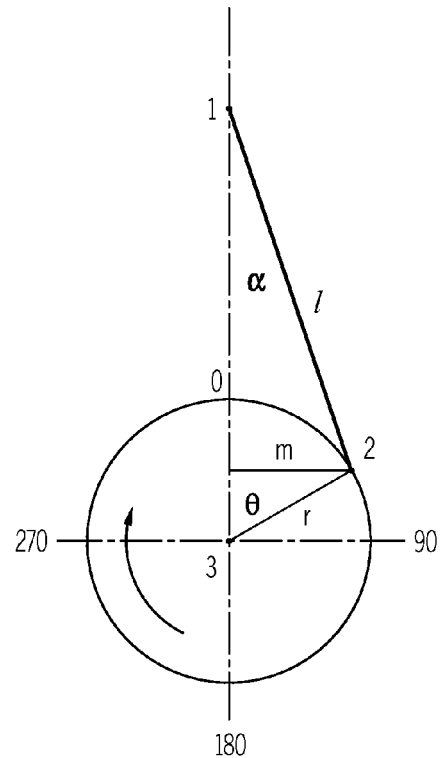
FIG. 1A
FIG. 1B
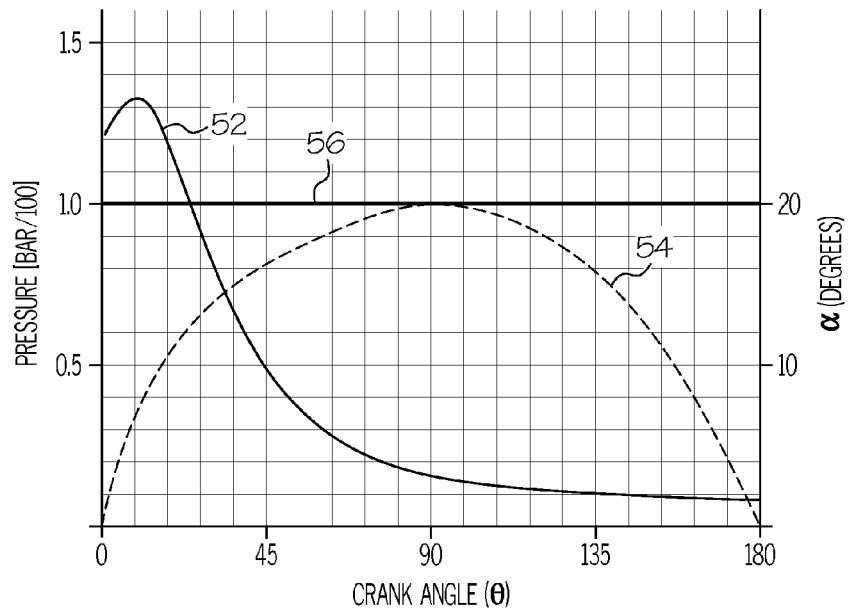
FIG. 2

| Crank Angle | Piston Pressure [BAR/100] | Piston Area | Piston Force [Normalized] | Crank Radius | Sine Crank Angle | Alpha | Cosine Alpha | Torque [DxExFxH] |
|---|---|---|---|---|---|---|---|---|
| 0 | 1.22 | 3.14159 | 0.924242424 | 1 | 0 | 0 | 1 | 0 |
| 9 | 1.32 | 3.14159 | 1 | 1 | 0.156 | 4 | 0.997 | 0.155532 |
| 18 | 1.2 | 3.14159 | 0.909090909 | 1 | 0.309 | 7.5 | 0.991 | 0.278380909 |
| 27 | 0.9 | 3.14159 | 0.681818182 | 1 | 0.453 | 8.8 | 0.988 | 0.305157273 |
| 36 | 0.7 | 3.14159 | 0.530303030 | 1 | 0.587 | 13 | 0.974 | 0.303194394 |
| 45 | 0.48 | 3.14159 | 0.363636364 | 1 | 0.707 | 15 | 0.965 | 0.248092727 |
| 54 | 0.35 | 3.14159 | 0.265151515 | 1 | 0.809 | 16.8 | 0.957 | 0.20528375 |
| 63 | 0.28 | 3.14159 | 0.212121212 | 1 | 0.891 | 18 | 0.951 | 0.179739 |
| 72 | 0.23 | 3.14159 | 0.174242424 | 1 | 0.951 | 19 | 0.946 | 0.1567565 |
| 81 | 0.19 | 3.14159 | 0.143939394 | 1 | 0.987 | 19.5 | 0.943 | 0.133970295 |
| 90 | 0.18 | 3.14159 | 0.136363636 | 1 | 1 | 20 | 0.94 | 0.128181818 |
| 99 | 0.15 | 3.14159 | 0.113636364 | 1 | 0.987 | 19.5 | 0.943 | 0.105766023 |
| 108 | 0.12 | 3.14159 | 0.090909091 | 1 | 0.951 | 19 | 0.946 | 0.081786 |
| 117 | 0.11 | 3.14159 | 0.083333333 | 1 | 0.891 | 18 | 0.951 | 0.07061175 |
| 126 | 0.1 | 3.14159 | 0.075757576 | 1 | 0.809 | 16.8 | 0.957 | 0.0586525 |
| 135 | 0.1 | 3.14159 | 0.075757576 | 1 | 0.707 | 15 | 0.965 | 0.051685985 |
| 144 | 0.095 | 3.14159 | 0.071969697 | 1 | 0.587 | 13 | 0.974 | 0.041147811 |
| 153 | 0.09 | 3.14159 | 0.068181818 | 1 | 0.453 | 8.8 | 0.988 | 0.030515727 |
| 162 | 0.085 | 3.14159 | 0.064393939 | 1 | 0.309 | 7.5 | 0.991 | 0.019718648 |
| 171 | 0.08 | 3.14159 | 0.060606061 | 1 | 0.156 | 4 | 0.997 | 0.009426182 |
| 180 | 0.075 | 3.14159 | 0.056818182 | 1 | 0 | 0 | 1 | 0 |

AVERAGE TORQUE  0.122076157

FIG. 4

| Crank Angle [degrees] | Piston Pressure [BAR/100] | Piston Area | Piston Force [Normalized] | Crank Radius | Torque [DxE] |
|---|---|---|---|---|---|
| 0 | 1.22 | 3.14159 | 0.924242424 | 1 | 0.924242424 |
| 9 | 1.32 | 3.14159 | 1 | 1 | 1 |
| 18 | 1.2 | 3.14159 | 0.909090909 | 1 | 0.909090909 |
| 27 | 0.9 | 3.14159 | 0.681818182 | 1 | 0.681818182 |
| 36 | 0.7 | 3.14159 | 0.530303030 | 1 | 0.530303030 |
| 45 | 0.48 | 3.14159 | 0.363636364 | 1 | 0.363636364 |
| 54 | 0.35 | 3.14159 | 0.265151515 | 1 | 0.265151515 |
| 63 | 0.28 | 3.14159 | 0.212121212 | 1 | 0.212121212 |
| 72 | 0.23 | 3.14159 | 0.174242424 | 1 | 0.174242424 |
| 81 | 0.19 | 3.14159 | 0.143939394 | 1 | 0.143939394 |
| 90 | 0.18 | 3.14159 | 0.136363636 | 1 | 0.136363636 |
| 99 | 0.15 | 3.14159 | 0.113636364 | 1 | 0.113636364 |
| 108 | 0.12 | 3.14159 | 0.090909091 | 1 | 0.090909091 |
| 117 | 0.11 | 3.14159 | 0.083333333 | 1 | 0.083333333 |
| 126 | 0.1 | 3.14159 | 0.075757576 | 1 | 0.075757576 |
| 135 | 0.1 | 3.14159 | 0.075757576 | 1 | 0.075757576 |
| 144 | 0.095 | 3.14159 | 0.071969697 | 1 | 0.071969697 |
| 153 | 0.09 | 3.14159 | 0.068181818 | 1 | 0.068181818 |
| 162 | 0.085 | 3.14159 | 0.064393939 | 1 | 0.064393939 |
| 171 | 0.08 | 3.14159 | 0.060606061 | 1 | 0.060606061 |
| 180 | 0.075 | 3.14159 | 0.056818182 | 1 | 0.056818182 |

AVERAGE TORQUE 0.290584416

FIG. 5

POWER DELIVERY DEVICES FOR RECIPROCATING ENGINES AND RELATED SYSTEMS AND METHODS

RELATED APPLICATIONS

This application claims the benefit of U.S. Provisional Patent Application Ser. No. 61/830,456 filed Jun. 3, 2013, entitled "Power Delivery Devices for Reciprocating Engines and Related Systems and Methods," the contents of which are hereby incorporated herein by reference in their entirety.

TECHNICAL FIELD

This disclosure generally relates to reciprocating engines, and more particularly to power delivery devices for reciprocating engines, and to related systems and methods.

BACKGROUND

A reciprocating engine generally uses a crankshaft to convert the linear reciprocating motion of one or more pistons translating within cylinders into the rotational motion of the crankshaft and vice versa. For example, the internal combustion engine (IC engine) is the most common type of reciprocating engine. Reciprocating engines are generally used to convert the chemical energy released during the combustion of various fuels (such as gasoline) or thermal energy (such as energy derived from steam) into kinetic energy (e.g., mechanical rotating motion), which can be more readily usable to move things (e.g., propel objects). The crankshaft of a reciprocating engine is typically the engine element that is connected to output devices used to move various devices or vehicles, such as automobiles, generators, trucks, airplanes, welders, ships, bulldozers, motorcycles, boats, etc.

SUMMARY

In some aspects, methods of extracting mechanical work from an operating reciprocating engine can include applying a torque moment to an output shaft of the reciprocating engine using a maximum length torque moment arm that remains a substantially constant length as a reciprocating element of the engine reciprocates and the output shaft rotates.

Embodiments can include one or more of the following features.

The substantially constant length can be substantially the same as a crankshaft radius of a crankshaft of the reciprocating engine. The using a maximum length torque moment arm can include coupling the reciprocating element of the engine to the output shaft using a substantially constant length moment arm. The extracting mechanical work can further include increasing an output power of the reciprocating engine by applying the torque moment using the maximum length torque moment arm. The maximum length torque moment arm can include a moment arm that remains at its maximum length throughout a rotation of the output shaft. For example, the coupling the reciprocating element of the engine to output shaft can include coupling the output shaft to a rotating torque delivery device defining a substantially constant torque moment arm, the rotating torque delivery devices being configured to interface with the reciprocating element of the engine. The engine can be an internal combustion engine.

The applying the torque moment to the output shaft of the reciprocating engine using the maximum length torque moment arm that remains a substantially constant length can include coupling a translating member to the reciprocating element of the reciprocating engine; and coupling the translating member to the output shaft using the maximum length torque moment arm. For example, the torque moment arm can be substantially perpendicular to a reciprocating axis of the translating member to apply torque to the rotatable power output member. The torque moment arm that remains a substantially constant length can include a rotatable gear device coupled to the power output member and a gear rack coupled to the translating member.

In some aspects, a reciprocating engine can include at least one substantially invariant length torque moment arm that remains substantially constant during reciprocation of a reciprocating element and a rotation of an output shaft of the engine.

Embodiments can include one or more of the following features.

The substantially invariant length torque moment arm can have a length equivalent to a crankshaft radius of a crankshaft of the engine. The engine can also include a device to convert a reciprocating motion of the reciprocating element of the engine into a rotational motion of the output shaft using the substantially invariant length torque moment arm. The engine can also include at least one reciprocating piston disposed within a cylinder, the piston being connected at one end to a crankshaft of the engine by a connecting rod and also additionally being connected to the output shaft by the substantially invariant length torque moment arm. For example, the substantially invariant length torque moment arm can be formed at least in part by a combination of a rotating device coupled to the output shaft and a translating element coupled to the reciprocating piston, where the rotating device defines the substantially invariant length torque moment arm. The rotating device can include at least one of a pulley, a gear, or a sprocket. The translating element can include at least one of a cable, a chain, a belt, a pull rod, or a gear rack. The engine can also include a clutch device disposed between the reciprocating piston and the output shaft. The engine can also include an energy storage device to temporarily store energy produced by a reciprocating element of the engine and subsequently release the energy to the output shaft as the reciprocating element travels within the engine.

The substantially invariant length torque moment arm can include a torque moment arm that generates the torque: i) being defined between the rotational axis of the output shaft and a contact point between a translating member and a rotatable member; ii) being generally perpendicular to the motion of the translating member; and iii) remaining a substantially constant length during reciprocation of a reciprocating element of the engine.

In some aspects, a power delivery device to couple to a reciprocating element of a reciprocating engine can include an axially translating tension member to couple to and translate with the reciprocating element; and a rotatable member coupled to a power output element and interfacing with the translating tension member, the translating tension member providing an axial force to the rotatable member that applies a torque to the power output element during an axial motion of the translating tension member using a substantially constant length torque moment arm.

Embodiments can include one or more of the following features.

The torque moment arm that generates the torque can: i) be defined between the rotational axis of the power output element and a contact point between the translating tension member and the rotatable member; ii) be generally perpendicular to the motion of the translating tension member; and iii) remain a substantially constant length during reciprocation of the reciprocating element. The rotatable member can be coupled to the output element using a clutch device configured to permit the rotatable member to freely rotate relative to the output element in the second direction. The rotatable member can include a gear device and the translating tension member can include a gear rack that interfaces with the gear device.

In some embodiments, the reciprocating element can be a reciprocating piston; the power output element can be a rotating power output shaft other than a crankshaft of the engine; the translating tension member can be a pull rod device to connect to the reciprocating piston and translate based on a reciprocating motion of the piston; the engine can include a linear gear device coupled to the pull rod to translate with the pull rod; the engine can include a rotatable pinion gear coupled to the output shaft and configured to interface with the linear gear device; and the engine can include a one-way clutch device disposed between the output shaft and the pinion gear to engage the output shaft when the pinion gear rotates in a first direction of a piston motion towards a crankshaft by which it rotates, wherein a distance between a rotation axis of the output shaft and a contact region between the linear gear device and the pinion gear remains substantially constant as the piston reciprocates in the engine.

In some aspects, a reciprocating engine can include at least one piston and cylinder, the at least one piston being connected at one end to a crankshaft via a connecting rod and additionally connected to an output shaft via a substantially invariant length torque moment arm, the engine including an axially translating element to couple to and translate with the reciprocating piston; and a rotatable member coupled to the output shaft and interfacing with the translating element, the translating element providing an axial force to the rotatable member that applies a torque to the output shaft during an axial motion of the translating element, the substantially invariant length torque moment arm: i) being defined between the rotational axis of the output shaft and an interface region between the translating element and the rotatable member; and ii) being generally perpendicular to the motion of the translating element.

Embodiments can include one or more of the following features.

The substantially invariant length torque moment arm can remain substantially unchanged during inward motions of the piston towards the crankshaft and outward motions of the piston away from the crankshaft. The rotatable member can include a gear device and the axially translating element can include a tension device to engage the dear device. The engine can also include a clutch device to selectively engage the output shaft based on a direction of motion of the translating element. The at least one piston and cylinder comprises four in-line piston and cylinders, each of the pistons being configured to engage and rotate the output shaft via a substantially invariant length torque moment arm.

In some aspects, a power delivery device configured to couple to a reciprocating element of a reciprocating engine can include an axially translating tension member to couple to and translate with the reciprocating element; and a rotatable member coupled to a power output element and interfacing with the translating tension member, the translating tension member providing an axial force to the rotatable member that applies a torque to the power output element during an axial motion of the translating tension member, where a torque moment arm that generates the torque: i) is defined between the rotational axis of the power output element and a contact point between the translating tension member and the rotatable member; ii) is generally perpendicular to the motion of the translating tension member; and iii) remains a substantially constant length during reciprocation of the reciprocating element.

Embodiments can include one or more of the following features.

The translating tension member can include a pull rod. The rotatable member can be configured to interface with the translating tension member to engage and rotate the output element when the translating tension member moves in a first direction and to disengage the output element to freely rotate relative to the output element when the translating tension member moves in a second direction that is opposite the first direction. The rotatable member can be coupled to the output element using a clutch device configured to permit the rotatable member to freely rotate relative to the output element in the second direction. For example, the clutch device can be a sprag clutch. The rotatable member can be a gear device and the translating tension member can be a gear rack that interfaces with the gear device. The rotatable member can include a sprocket or pulley and the translating tension member can include a chain or a cable element engageable with the sprocket or pulley wheel. The power output element can include a rotating output shaft. The power delivery device can include a sealing member to limit a loss of cylinder pressure of the reciprocating engine through an opening through which the power delivery device couples to the reciprocating element. The sealing member can include a labyrinth sealing member. The power delivery device can include an energy storage device to temporarily store energy produced by the reciprocating element and subsequently release the energy to the power deliver device as the reciprocating element travels within the engine. For example, the energy storage device can include a spring element coupled between a translating tension member coupled to the reciprocating element and a motion transfer device. The reciprocating element can be a piston configured to reciprocate within a cylinder of the reciprocating engine.

In some aspects, a reciprocating engine can include at least one reciprocating piston within a cylinder, the at least one reciprocating piston being connected at one end to a crankshaft via a connecting rod and connected to an output shaft at another end via a substantially invariant length torque moment arm, where the engine includes an axially translating element to couple to and translate with the reciprocating piston; and a rotatable member coupled to the output shaft and interfacing with the translating element, the translating element providing an axial force to the rotatable member that applies a torque to the output shaft during an axial motion of the translating element, the substantially invariant length torque moment arm: i) being defined between the rotational axis of the output shaft and an interface region between the translating element and the rotatable member; and ii) being generally perpendicular to the motion of the translating element.

Embodiments can include one or more of the following features.

The axially translating element can include a pull rod secured to the piston. The axially translating element can include a linear gear device. The linear gear device can include a gear rack. The rotatable member can include a gear to engage the linear gear device. The engine can include a clutch device coupled between the output shaft and the axially translating element. The clutch device can include a one directional clutch. The one directional clutch can include a freewheeling clutch device. The axially translating element can include a gear rack coupled to a pull rod and the rotatable member can include a pinion gear, to engage the gear rack, coupled to the output shaft via a clutch device, wherein via a translating motion of the pull rod, the gear rack rotates the output shaft. The clutch device can engage the output shaft substantially only during a down stroke of the piston towards the crankshaft. The clutch device can engage the output shaft as the piston travel inwardly towards the crankshaft and disengages the output shaft as the piston travels outwardly away from the crankshaft. The substantially invariant length torque moment arm can be defined between the rotational axis of the output shaft and the interface region between the translating element and the rotatable member and remain substantially unchanged during inward motions of the piston towards the crankshaft and outward motions of the piston away from the crankshaft. The engine can also include an energy storage device positioned between the axially translating element and the output shaft. The at least one reciprocating piston and cylinder can include four in-line piston and cylinders, each of the pistons being configured to engage and rotate the output shaft via a substantially invariant length torque moment arm.

In some aspects, methods of extracting rotatable power from a reciprocating engine can include coupling a translating member to a reciprocating member of the reciprocating engine; and coupling the translating member to a rotatable power output member using a substantially consistent length moment arm perpendicular to a reciprocating axis of the translating member to apply torque to the rotatable power output member.

Embodiments can include one or more of the following features.

The substantially consistent length moment arm can include a rotatable gear device coupled to the power output member and a gear rack coupled to the translating member. The engine can be an internal combustion engine. The translating member can disengage the rotatable output member when the translating member travels as a result of an outward motion of the reciprocating member. The rotatable power output member (e.g., output shaft) can include a rotating shaft other than a crankshaft of the engine.

In some aspects, a power delivery device configured to couple to a reciprocating piston of a reciprocating engine can include: a rotating power output shaft other than a crankshaft of the engine; a pull rod device to connect to the reciprocating piston and translate based on a reciprocating motion of the piston; a linear gear device coupled to the pull rod to translate with the pull rod; a rotatable pinion gear coupled to the output shaft and configured to interface with the linear gear device; and a one-way clutch device disposed between the output shaft and the pinion gear to engage the output shaft when the pinion gear rotates in a first direction of a piston motion towards a crankshaft by which it rotates, wherein a distance between a rotation axis of the output shaft and a contact region between the linear gear device and the pinion gear remains substantially constant as the piston reciprocates in the engine.

Embodiments can include one or more of the following features.

An energy storage element can be coupled between the pull rod and the linear gear device. The distance between a rotation axis of the output shaft and a contact region between the linear gear device and the pinion gear can be generally perpendicular to a translating axis of the linear device. The linear gear device can include a gear rack. The linear gear device can be a chain.

In some aspects, methods of extracting rotatable power from a reciprocating engine can include coupling a translating gear rack to a reciprocating piston of the reciprocating engine; coupling a rotating pinion gear to a rotating output shaft other than a crankshaft of the engine, the pinion gear interfacing with the gear rack to rotate the pinion gear in response to a translating motion of the piston and the gear rack; and using a clutch device, selectively engaging the output shaft with the pinion gear to rotate the output shaft only when the piston travels towards a crankshaft to which the piston is coupled, wherein a torque moment arm distance between a rotation axis of the output shaft and a contact region between the gear rack and the pinion gear remains substantially constant as the piston reciprocates in the engine.

In some aspects, methods herein can increase an output torque (e.g., an average output torque) of an operating reciprocating engine by maintaining a substantially constant length torque moment arm that drives an output shaft of the reciprocating engine. The engine can be an internal combustion engine. The engine can be an external combustion engine.

In some aspects, a reciprocating engine can include at least one piston and cylinder, said piston being connected on one end to a crankshaft via a connecting rod, said piston additionally being connected to an output shaft via a substantially invariant length torque moment arm. The moment arm can include a pull rod/gear rack/pinion gear/clutch arrangement. The gear rack can be disposed on the pull rod, the pinion gear is coupled to the output shaft via the clutch, and the gear rack is engageable to the pinion gear to rotate the output shaft. The clutch can include a freewheeling clutch. The clutch can include a sprag clutch.

In some aspects, an energy storage device can be positioned between a pull rod and an output shaft, the pull rod configured to couple to a reciprocating member of a reciprocating engine. The energy storage device can include springs (e.g., Belleville springs).

In some aspects, a pull rod pressure sealing device can be implemented to limit pressure loss of a reciprocating engine cylinder through an opening through which a pull rod enters the cylinder. The pressure sealing device can include a Labyrinth sealing means.

In some aspects, an automobile can include a reciprocating engine comprising at least one piston and cylinder, said piston being connected on one end to a crankshaft via a connecting rod, said piston additionally being connected to an output shaft via a substantially invariant length torque moment arm. The automobile can include one or more of light trucks, delivery trucks, fire trucks, over-the-road trucks, motorcycles, and passenger cars.

In some aspects, an off-road piece of equipment can include a reciprocating engine comprising at least one piston and cylinder, said piston being connected on one end to a crankshaft via a connecting rod, said piston additionally being connected to an output shaft via a substantially invariant length torque moment arm. The off-road piece of equipment can include one or more of farm tractors, construction equipment, trucks, graders, cranes, bulldozers, welders, and pumps.

In some aspects, a generator set (e.g., an electric generator set) can include a reciprocating engine having at least one piston and cylinder, said piston being connected on one end to a crankshaft via a connecting rod, said piston additionally being connected to an output shaft via a substantially invariant length torque moment arm.

In some aspects, a boat or ship can include a reciprocating engine with at least one piston and cylinder, said piston being connected on one end to a crankshaft via a connecting rod, said piston additionally being connected to an output shaft via a substantially invariant length torque moment arm.

In some aspects, an airplane or helicopter can include a reciprocating engine with at least one piston and cylinder, said piston being connected on one end to a crankshaft via a connecting rod, said piston additionally being connected to an output shaft via a substantially invariant length torque moment arm.

In some aspects, a power delivery device can be configured to couple to a reciprocating element of a reciprocating engine, and configured to couple to a power output element via a substantially consistent length moment arm.

Embodiments can include one or more of the following features.

The power delivery device can include a pull rod coupled to the reciprocating element. The power delivery device can include a rotatable member engagable with the pull rod, the rotatable member being configured to rotate the power output element. The rotatable member can be configured to engage and rotate the pull rod in substantially only in a first direction and permit the rotatable member to freely rotate relative to the output element in a second direction that is opposite the first direction. The rotatable member can be coupled to the output element using a clutch device configured to permit the rotatable member to freely rotate relative to the output element in the second direction. The clutch device can include a sprag clutch. The rotatable member can include a gear device and the pull rod can include a gear rack engageable with the gear device. The power output element can include an output shaft. The power delivery device can include a sealing member to limit a loss of cylinder pressure of the reciprocating engine through an opening through which the power delivery device couples to the reciprocating element. The sealing member can include a labyrinth sealing member. The power delivery device can include an energy storage device temporarily store energy produced by the reciprocating element and subsequently release the energy to the power deliver device as the reciprocating element travels within the engine. The energy storage device can include a spring element coupled between a pull rod and a motion transfer device. The spring element can include one or more Belleville springs and the motion transfer device can include a gear rack engageable with a rotatable gear coupled to the output element. The reciprocating element is a piston configured to reciprocate within a cylinder. In some aspects, a reciprocating engine can include the power delivery device. In some aspects, a kit for a reciprocating engine to increase power output of the reciprocating engine can include the power delivery device.

In some aspects, methods of extracting rotatable power from a reciprocating engine can include: coupling a translating member to a reciprocating member of the reciprocating engine; and coupling the translating member to a rotatable power output member using a substantially constant maximum length moment arm.

Embodiments can include one or more of the following features.

The substantially constant moment arm can include a rotatable gear device coupled to the power output member and a gear rack coupled to the translating member. The moment arm can include a pull rod/chain/sprocket/clutch arrangement. The moment arm can include a pull rod/cable/pulley/clutch arrangement.

In some aspects, methods of increasing an output power (e.g., an average output power) of an operating reciprocating engine include maintaining a substantially constant length torque moment arm that drives an output shaft of the reciprocating engine.

In some aspects, methods of increasing a thermal efficiency of an operating reciprocating engine can include maintaining a substantially constant length torque moment arm that drives an output shaft of the reciprocating engine.

In some aspects, the power delivery devices described herein can be used as a hybrid energy storage system where stored rotational energy is used to generate useful power (e.g., mechanical (e.g., rotational) power) as a result of both the rotation of the output shaft coupled to a rotation of a crankshaft of a reciprocating engine during a piston downstroke of the engine and also to generate useful power by utilizing the stored energy of the rotating output shaft which is configured to disengage from the piston (e.g., using a one way clutch) so that it can continue to rotate even if the crankshaft of the reciprocating engine has decelerated (e.g., or stopped). That is, as discussed below, the output shaft can be coupled to the reciprocating engine (e.g., to a piston of the engine) in a manner so that the output shaft is only coupled to the piston during a downstroke of the piston but is able continue to freely rotate during an upstroke of the piston. The stored energy of the freely rotating power output shaft once disengaged from the crankshaft can be used to create useful power to drive attached loads when the engine decelerates or stops.

As discussed herein, in some cases, the output shaft can have a potentially different rotational speed than the engine crankshaft during use. Therefore, a difference in rotational speed between the output shaft and the connection point between the piston and the clutch device (e.g., at the pulley or sprocket coupled to an outer portion of the clutch device (or whichever portion of the clutch device that is not directly coupled to the output shaft)) can also exist during use. As a result of the reciprocating motion of the piston (i.e., and the associated pulsing of the outer portion of the clutch device), the resulting motion of the output shaft based on the input from the outer portion of the clutch device can include a pulsing rotation that varies in speed and torque as the reciprocating piston moves throughout its stroke. Therefore, in some embodiments, the power delivery device can include a coupling (e.g., a fluid coupling (e.g., a torque convertor)) connected in between the power delivery device and the system to which the power delivery device is providing power, which can help reduce (e.g., minimize) negative effects of such pulsing motion and may also serve as a torque multiplying device (e.g., a torque multiplying torque convertor). For example, the coupling can be connected to an end of the power delivery device output shaft and a shaft of an automobile drivetrain, a generator input shaft, or other similar system input.

DEFINITIONS

The following definitions are generally used in the engineering industry and can be found in many text books and Internet sources. They are provided here to be used for example purposes only and are not intended to be limiting to this disclosure.

Torque is a twisting force applied to an object, such as a wheel or a crankshaft. Note that motion is not required for torque to exist. For example, if you stand on a lug wrench that is attached to a frozen lug bolt, you are applying a torque to that bolt even though there may be no movement. For simplicity purposes, torque herein is measured and described in units of pounds-force feet (lbf-ft), meaning the equivalent of a given force, in pounds, acting on the end of a lever of length in feet. For example, standing with 180 pounds of body weight on a lug wrench having a one foot long moment arm yields a resulting torque of 180 lbf-ft. Additionally, a child of 90 pounds standing on a two-foot lug wrench applies the same resulting torque.

Work is the application of force over a distance. It is noted that the units used to describe work are the same as torque (e.g., pounds times feet) but the work units can be written as ft-lb to distinguish from a torque value. The practical difference between torque and work is that in this or work case, the distance units (e.g., the "feet" part) describes length (e.g., feet) of movement, whereas for torque, the distance describes the length of the moment arm. If a car is pushed with 100 pounds of force for 30 feet, then the work done is 3000 ft-lb of work. An easier example is lifting a weight (in pounds) by a given distance (in feet). If you use some sort of mechanical advantage, such as a winch, you will do the same amount of work because by halving the effort required, you will have to double the distance through which you apply the force to achieve the same objective.

Power is the application of work over a finite time. 550 ft-lb of work in one second is the equivalent of one horsepower (HP).

So, the following descriptions and calculations are used to explain the conversion to get from torque to horsepower. Pushing with 87.5 pounds (force) on the end of our 1-foot moment arm lug wrench applies a torque of 87.5 lbf-ft. Since there is no motion yet, no work or power is produced. However, consider the lug bolt loosens slightly and starts to turn but that same 87.5 pounds of force is needed to keep the wrench turning. For every revolution of the wrench, 87.5 pounds of force is applied over a distance of (2*π*1 foot) or 6.28 feet (which is the circumference of the circle that the hand pushing the wrench is making). Therefore, a total of 550 ft-lb of work is generated to rotate the wrench. It is only when this system is actually moving that work is being performed. From calculating the work, it is a quick step to say that if the work is applied fast enough to turn that wrench one revolution per second, then 550 ft-lb of work is performed per second, which means one horsepower of power is being applied.

By the definitions it can be seen that HP is directly proportional to torque and RPM. "Directly proportional" means there may be a multiplier involved. Using the above example numbers, remembering that 1 revolution per second is 60 RPM, the relationship between HP, torque, and RPM can be determined as shown below:

torque*RPM*constant=hp 87.5 lbf-ft*60 rev/min*$X$=1 hp $X$=1/(60*87.5)=1/5250 torque*RPM*1/5250=hp hp=(torque*RPM)/5250

For internal combustion engines, torque is typically given at a certain RPM because the engine cannot generate torque when it is not rotating. Once the engine is running fast enough to sustain its own operation, the force that exerted against a load can be measured, and the speed at which the engine is turning can be measured. Therefore, the torque (and therefore power) values can be determined.

In some embodiments, the term clutch device, which can include a one-way freewheeling clutch, a bearing clutch, such as a sprag clutch (e.g., a CSK model one-way bearing), or other similarly suitable one-way clutch devices, is used to describe a device that disengages the driveshaft (i.e., the crankshaft of a reciprocating engine according to the description herein) from the driven shaft (i.e., the output shaft of the power delivery devices described herein) when the driven shaft rotates faster than the driveshaft, for example, when the reciprocating engine is decelerated and the crankshaft slows down, as discussed below.

Identified Problems with Conventional Reciprocating Engine Design

In continuous operation, crankshaft type reciprocating engines convert the reciprocating motion of the pistons into the rotational motion of a load connected crankshaft. A reciprocating internal combustion (IC) engine uses the crankshaft mechanism to convert the explosive energy released within the combustion chamber (e.g., cylinder) via the combustion of fossil fuels into rotational mechanical energy used to propel objects. External combustion (EC) engines, such as steam engines, also use the crankshaft mechanism. Whether an IC engine is 2 or 4 (or more) cycle and/or whether it is gasoline, propane, natural gas, or diesel (or other types of fuels or heat cycles), most reciprocating engines use the crankshaft to convert the reciprocating motion (power) of the pistons into rotational mechanical motion (power).

Simply stated, the systems and methods discussed herein are directed to separating the reciprocating engine's output torque (power) from the crankshaft and to deliver that torque (power) through an alternate power delivery device (e.g., powertrain) path, which has a relatively invariant (e.g., consistent or constant) maximum length moment arm producing the torque for the output shaft.

Such systems and methods are expected to be advantageous for at least the following reasons.

The crankshaft in a typical reciprocating engine, as its primary function, returns each of the one or more pistons of the engine to a previous position in their respective cylinder during the various cycles of the engine. In addition, the crankshaft is secondarily used to deliver the rotational energy to whatever load the engine is coupled to. The crankshaft performs effectively in returning pistons to their previous positions (e.g., top dead center), but it is generally inefficient in delivering the potential torque and power to the engine's applied load. A major cause for this inefficiency is a fundamental varying of the torque moment arm length as the crankshaft rotates. The length varies from zero to a maximum each half rotation of the crankshaft. Therefore, a power delivery device for a reciprocating engine that uses a substantially constant maximum length moment arm to generate torque and power for a power output shaft of the engine is expected to produce greater (e.g., significantly greater) torque and power relative to a similarly sized engine that utilizes a conventional crankshaft as a power output shaft.

Therefore, the systems and methods described herein can be utilized to create more energy efficient engines, which can be designed and manufactured in reduced size, using smaller components and still produced a desired level of power. In some cases, these improvements in efficiency and power output are expected to also have a direct influence on fuel consumption and efficiency, which can result in more fuel efficient engines. For example, for automobile applications, such increases in fuel efficiency is expected to impact ownership costs for operating an automobile having a power delivery device with a constant moment arm, as described herein.

BRIEF DESCRIPTION OF DRAWINGS

FIG. 1a is schematic of a conventional reciprocating engine.

FIG. 1b is an enlarged schematic view of the reciprocating engine of FIG. 1a illustrating a moment arm that varies as a crankshaft rotates.

FIG. 2 is a plot of an example cylinder pressure curve of an internal combustion engine during a power stroke and corresponding moment arm lengths (e.g., a conventional moment arm and a constant moment arm) used to transfer the pressure into a driving torque.

FIG. 4 is a table of calculations used to estimate torque produced in a conventional internal combustion engine at various crank angles during a power stroke.

FIG. 5 is a table of calculations used to estimate torque produced in an internal combustion engine utilizing a constant moment arm to produce torque at various crank angles during a power stroke.

DETAILED DESCRIPTION

Figure 3:
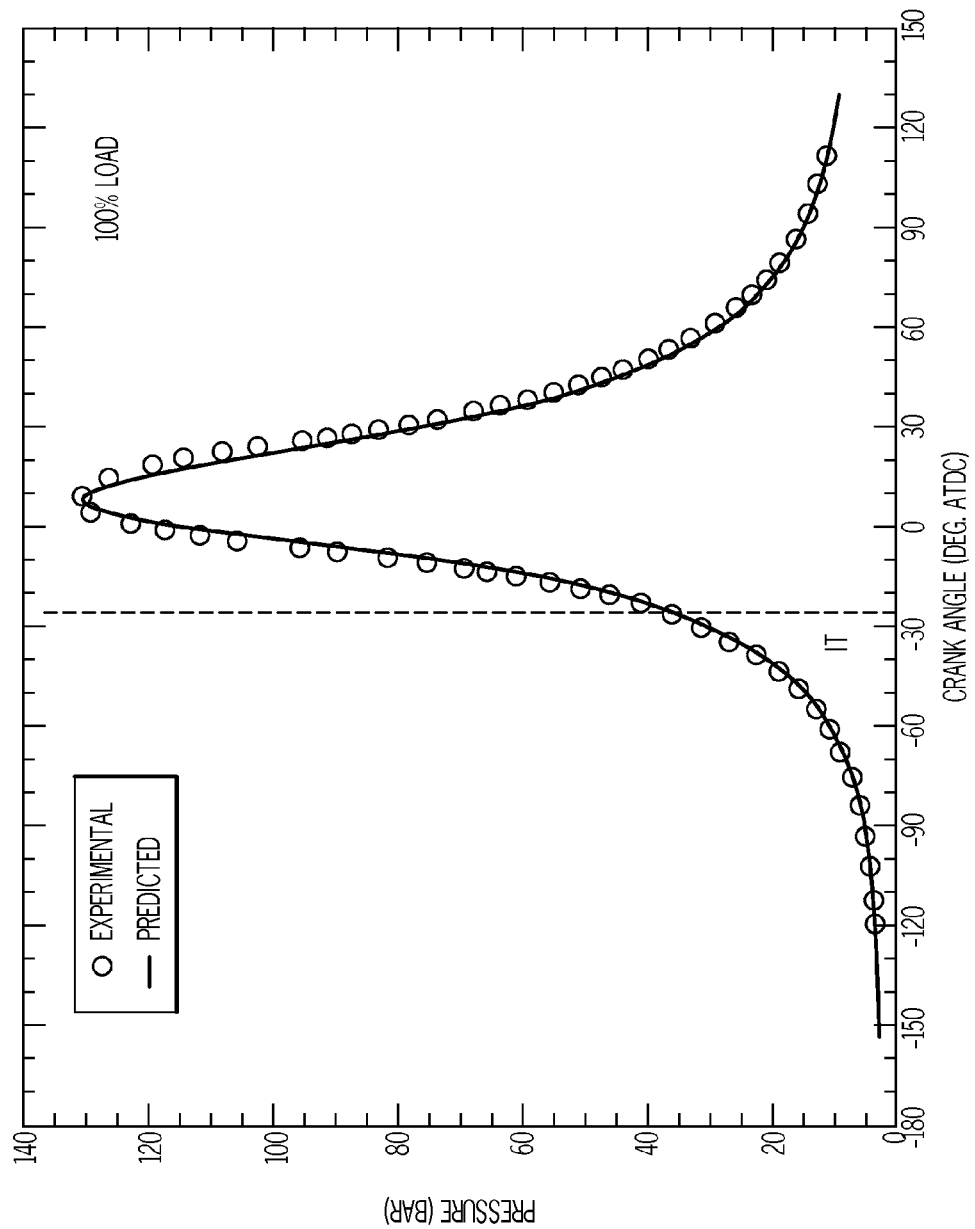
FIG. 3 is a plot of another example cylinder pressure curve of an internal combustion engine during a power stroke.

FIGS. 1*a* and 1*b* illustrate a schematic of a reciprocating engine 100 having a fixed cylinder 102, a piston 104, a connecting rod 106, and a crankshaft 108. As illustrated, the piston 104 is moving downwardly within the cylinder 102 during a power stroke and the crankshaft 108 is rotating clockwise. A typical power stroke in an IC engine continues from a crank angle (θ) of 0° After Top Dead Center (ATDC) to the piston's bottom most position at 180° ATDC of rotation.

The applied vertical force of the piston on the crankshaft of an IC engine (as a result of combustion pressure within the cylinder) can be written as:

$$\text{VerticalForce} = P(\theta) \cos \alpha \cdot A \qquad \text{Eqn. 1}$$

Where P(θ) is the combustion pressure, which is a function of crank angle (θ) (relative to Top Dead Center), A is the total projected surface area of the top of the piston generally perpendicular to the axis of travel 110, and α is the connecting rod angle (relative to the centerline of the cylinder). Note that in some engine designs the connecting rod may be connected to the piston via a piston pin (e.g., wrist pin) off axis from the centerline of the piston which typically affects the connecting rod angle. Piston pin offset can be a manufacturer's way of reducing stress on reciprocating parts as it permits these parts to be lighter, which can result in more efficient manufacture and less power loss in the engine, as well as higher rpm capabilities. A complementary result of piston pin offset can be reduced piston slap due to a more gradual shift from major to minor thrust during engine operation.

The moment arm (or torque arm) (e.g., provided as "m" in FIG. 1*b*) that generates the twisting force on the crankshaft varies as the crankshaft rotates. The moment arm (m) is the horizontal distance between the rotational axis (3) of the crankshaft main journal (which is typically positioned at the centerline 110 of the piston and/or cylinder) and the rotational axis (2) of the crank pin journal where the connecting rod is connected to the crankshaft. Therefore, the varying length of the moment arm can be written in terms of the rotational position of the crankshaft (e.g., crank angle θ) as:

$$\text{MomentArm} = r \sin \theta \qquad \text{Eqn. 2}$$

Where r is the radial distance from the centerline (e.g. rotational axis) (3) of the crankshaft main journal to the centerline (e.g., rotational axis) (2) of the throw arm or crank pin for the connecting rod (i.e., where the connecting rod is connected to the crankshaft), therefore, r sin(θ) is the length of the vertical force torque moment arm. Note that the maximum length of the varying torque moment arm occurs at a crank angle of 90 degrees and is equal to the crank radius.

Using the above definitions of the various connected pieces, the following equation can be written to represent the crankshaft torque (twisting force) (T) as a function of crank angle θ:

$$T(\theta) = \text{VerticalForce}(\theta) \cdot \text{MomentArm}(\theta) \qquad \text{Eqn. 3}$$

After combining the above equations, the torque developed by a reciprocating engine during the power stroke can be represented as:

$$T(\theta) = P(\theta) \cos \alpha \cdot A \cdot r \sin(\theta) \qquad \text{Eqn. 4}$$

As shown, this torque equation is heavily dependent on crank angle (θ). For a fixed engine design, A and r are constant and α is a function of the moment arm (i.e., r sin θ) and the connecting rod length (l). The connecting rod length (l) is equal to the distance between the rotational axis (1) of the wrist pin (which connects the connecting rod to the piston and the rotational axis (2) of the crank pin. Piston pressure P(θ) is also a very strong function of crank angle (θ) and is different for many combustion related factors (e.g., fuel-to-air ratio, compression ratio, fuel type, and other factors). Pressure P(θ) can also be different for IC engines vs. EC engines. The piston pressure can also vary with changes in engine rotational speed, which is commonly denoted in rotations per minute (RPM).

In a typical IC engine, the pressure acting in the cylinder on the top of the piston (e.g., the piston pressure) peaks slightly after the crankshaft's Top Dead Center (TDC) position, at about 9° to 18° ATDC depending on the particular engine design, and can vary with engine rotational speed. For example, FIG. 2 depicts an example piston pressure 52 and moment arm length 54 of an example IC engine as a function of crank angle (θ). As shown, the piston pressure 52 reaches a maximum value several degrees after TDC and then decays fairly rapidly as the piston moves towards its bottom position at 180° ATDC. The moment arm length 54 function (r sin θ) starts at zero at 0° at TDC (as the connecting rod-to-crankshaft connecting point is directly above the crankshaft main journal rotational axis (e.g., centerline)), reaches a maximum at 90° (as the crank pin rotational axis is typically directly beside the crankshaft main journal rotational axis), and moves again to 0° at 180° (as the connecting rod-to-crankshaft connecting point returns to directly above the crankshaft centerline). As can be seen in this plot of FIG. 2, when the vertical force on the piston is at maximum, near the top of the stroke, the moment arm acting to rotate the crankshaft is very short. This varying moment arm impacts and limits the developed torque significantly.

Also illustrated in FIG. 2 is an example constant length moment arm 56 that would be seen if the output powertrain had a constant length moment arm as described herein having a length that is roughly the maximum length of the varying moment arm throughout the entire power stroke. As shown and discussed below, having such a constant length moment arm to generate torque (i.e., in particular during the maximum pressure within the cylinder) enables extraction of more output torque and power from the IC engine.

To demonstrate the impact of the constant length moment arm in relation to the varying moment arm on the engine output torque and horsepower, predicted power calculations for two cases for a typical IC engine can be calculated. The first case is for a varying moment arm (MomentArm=r sin θ) and the second case is for a constant length moment arm (MomentArm=m).

A simple comparison between the varying moment arm configuration and the constant moment arm configuration can be estimated by comparing the various equations described herein using equal corresponding values for both cases, Using Equation 4 above with the example pressure curve illustrated in FIG. 3 (taken from Rakopoulos, C., Michos, C., and Giakoumis, E, *Availability analysis of a syngas fueled spark ignition engine using a multi-zone combustion model*, Energy, Volume 33, issue 9 (September 2008), p. 1378-1398, the contents of which is hereby incorporated by reference in their entirety), example torque values for the varying moment arm engine can be calculated at various crankshaft angles throughout the power stroke. For simplicity in comparing the torque values, the various parameters and dimensions were normalized using several unit-less values. In particular, an engine stroke (S) of 2; a piston area (A) of 3.14159; an engine bore (B) of 2; a crankshaft radius (r=S/2) of 1; a connecting rod length (L) of 2.924 were all used to simplify the calculations. Results of these example calculations are presented in the table of FIG. 4. As indicated, using these exemplary values, the typical IC engine was found to produce an average torque of about 0.122076.

For the constant length moment arm IC engine, as discussed above, the torque equation can be simplified to T(θ)=P(θ) A·m, where P(θ) is the cylinder pressure based on the crank angle (e.g., as depicted in FIG. 3) and m is the length of the constant moment arm (e.g., the moment arm (m)=the radius (r) of the moment arm=S/2). Similar to the typical IC engine with a varying moment arm discussed above, estimated torque values can be calculated at various crankshaft angles throughout the power stroke using the same normalized dimensions as above. Results of these example calculations are presented in the table of FIG. 5. As indicated, using these exemplary values, the theoretical modified IC engine having a constant moment arm was found to produce an average torque of about 0.290584. Therefore, the average output for the IC engine having the constant moment arm is about 2.38 times that of the typical varying moment arm IC engine.

Figure 6:
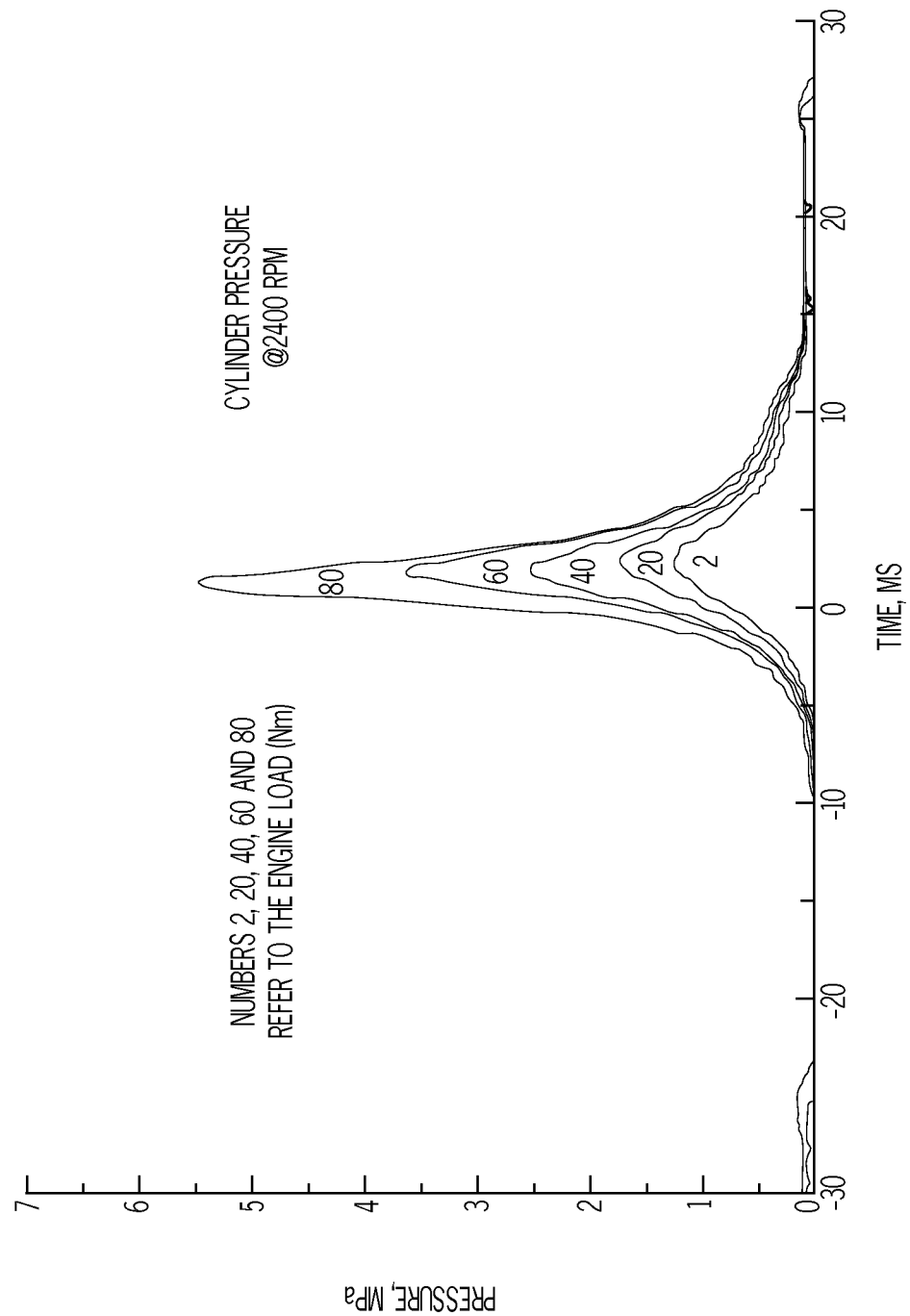
FIG. 6 is a plot of multiple example cylinder pressure curves within an internal combustion engine at several different engine loads during a power stroke.
Figure 7:
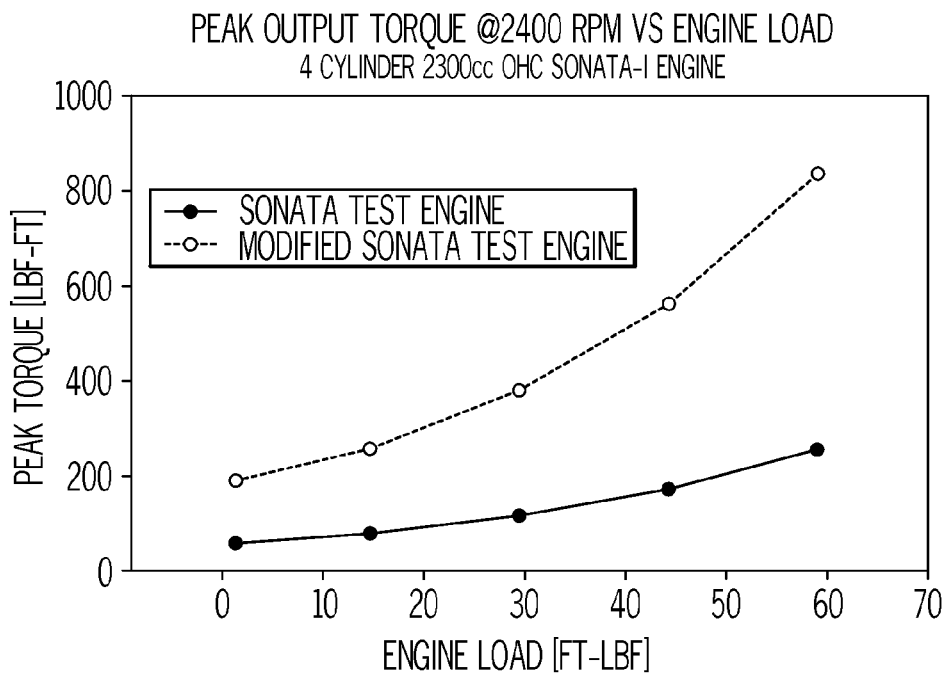
FIGS. 7-14 are plots that illustrate theoretical increased power and torque output using a power delivery device having a constant moment arm.
Figure 8:
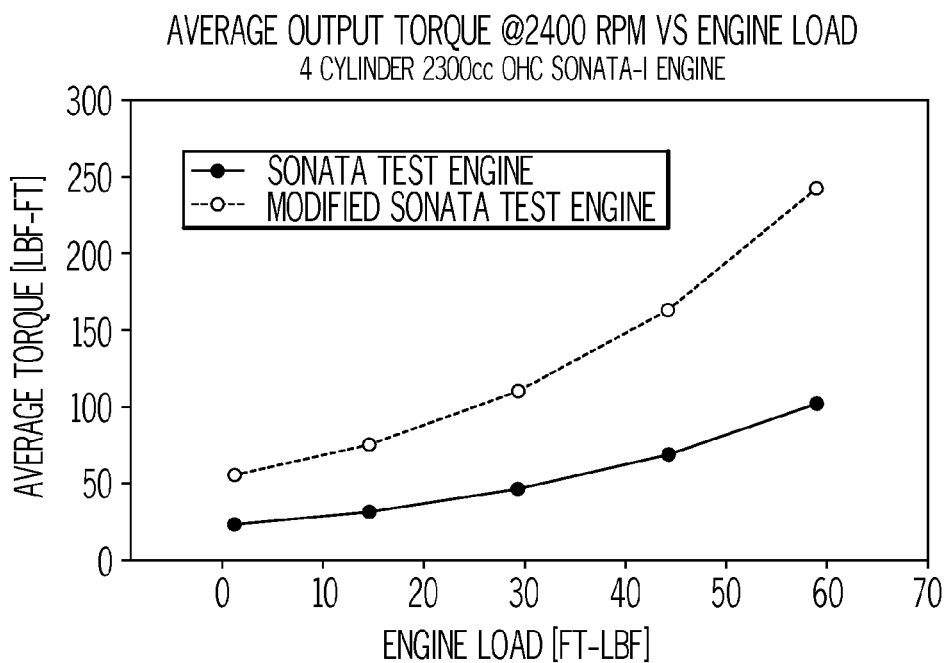
Figure 9:
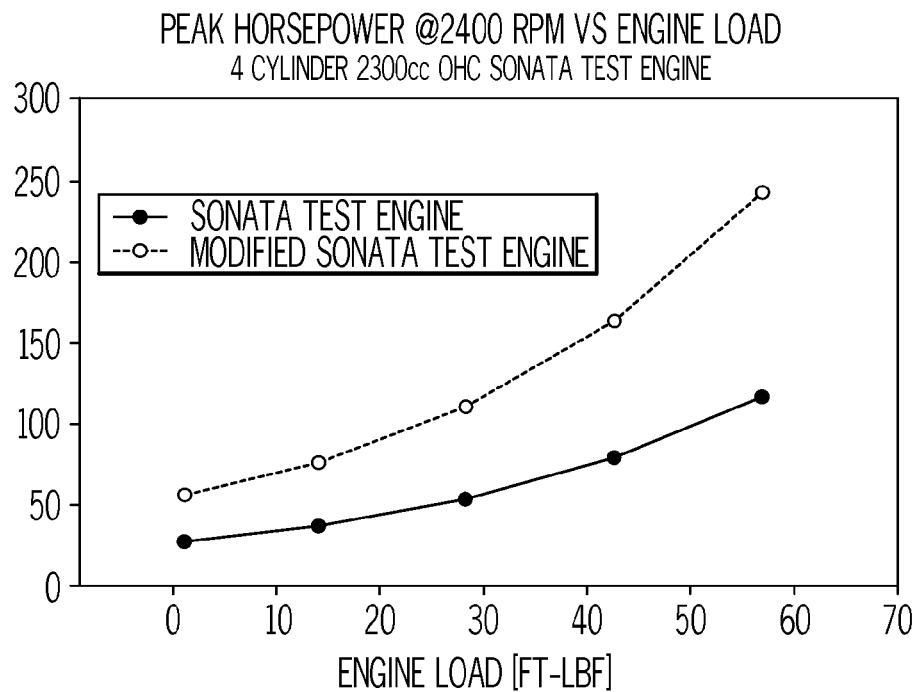
Figure 10:
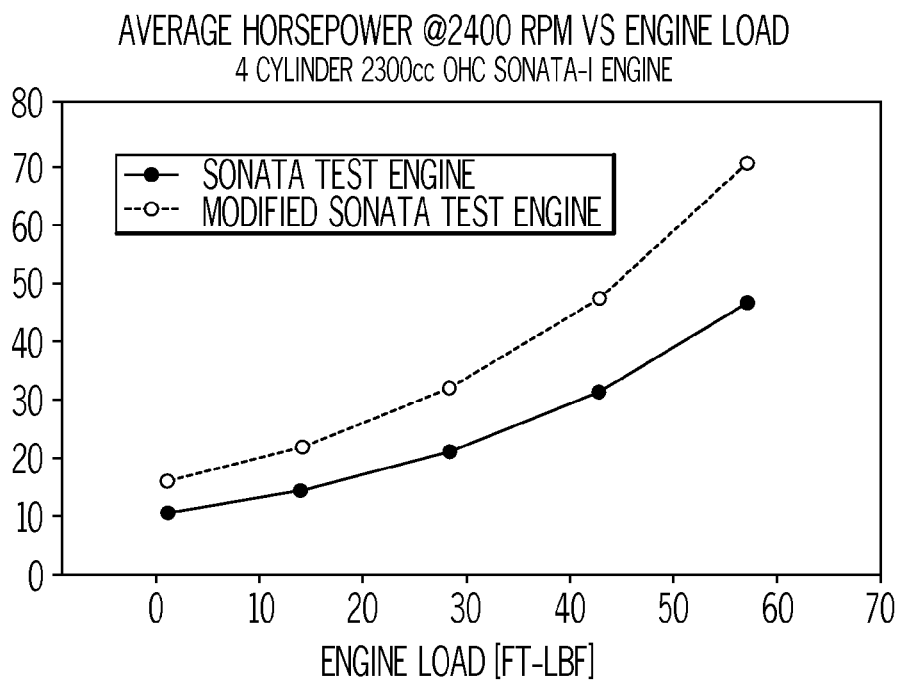
Figure 11:
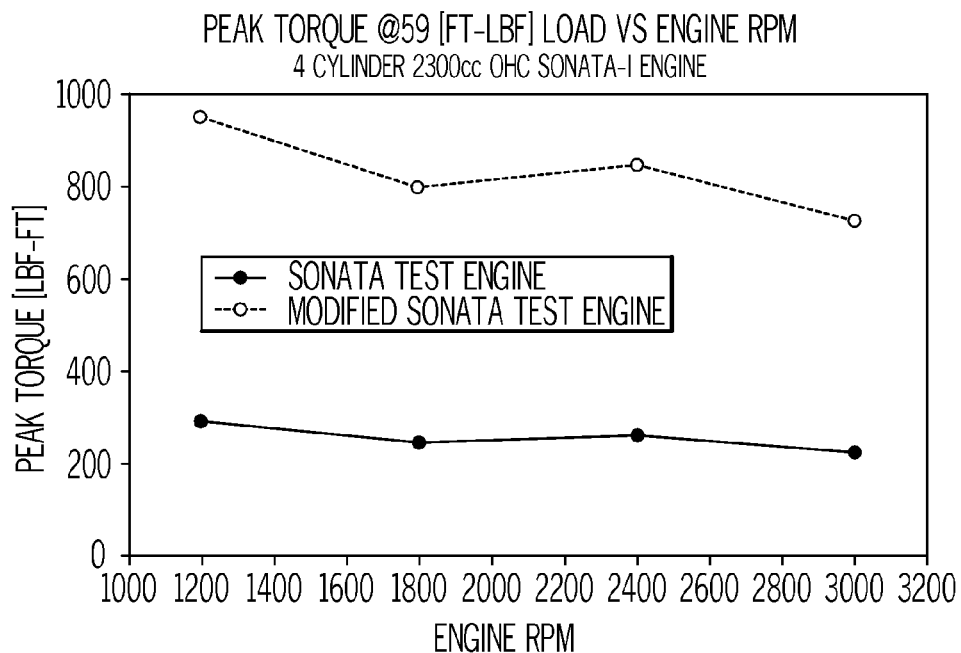
Figure 12:
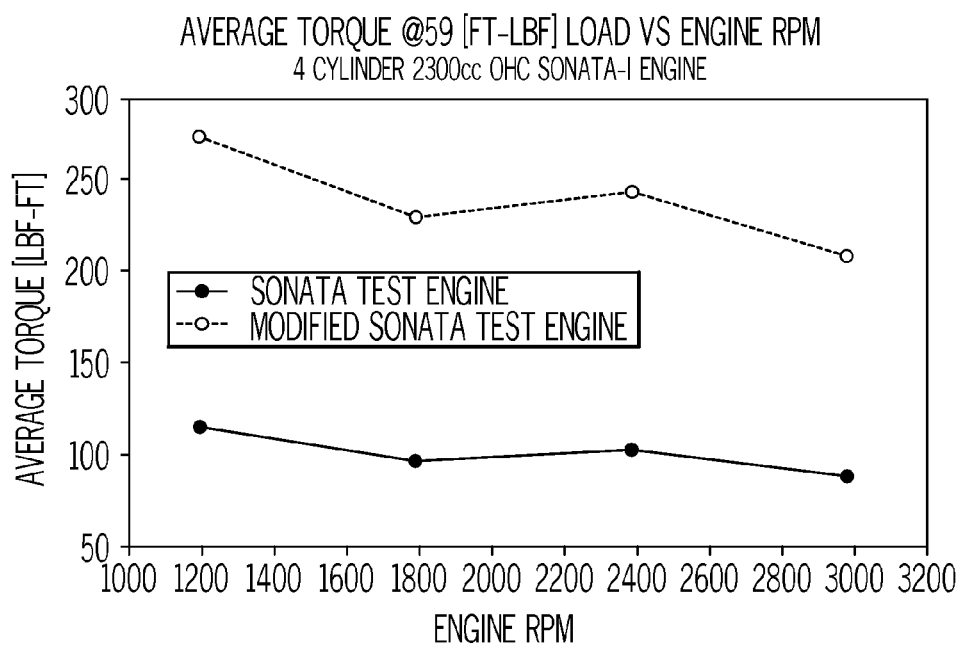
Figure 13:
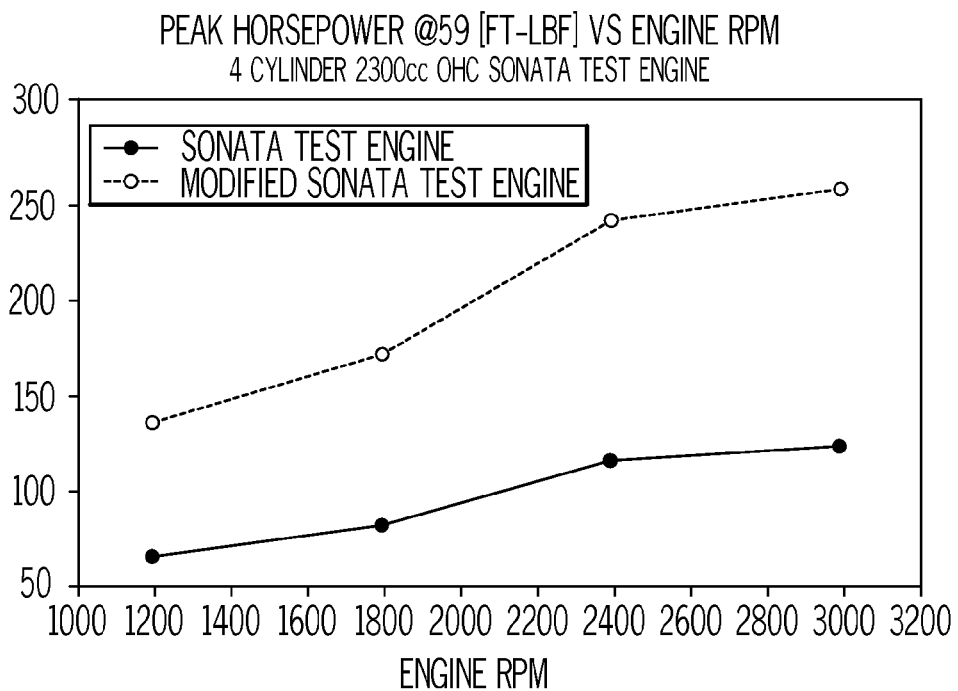
Figure 14:
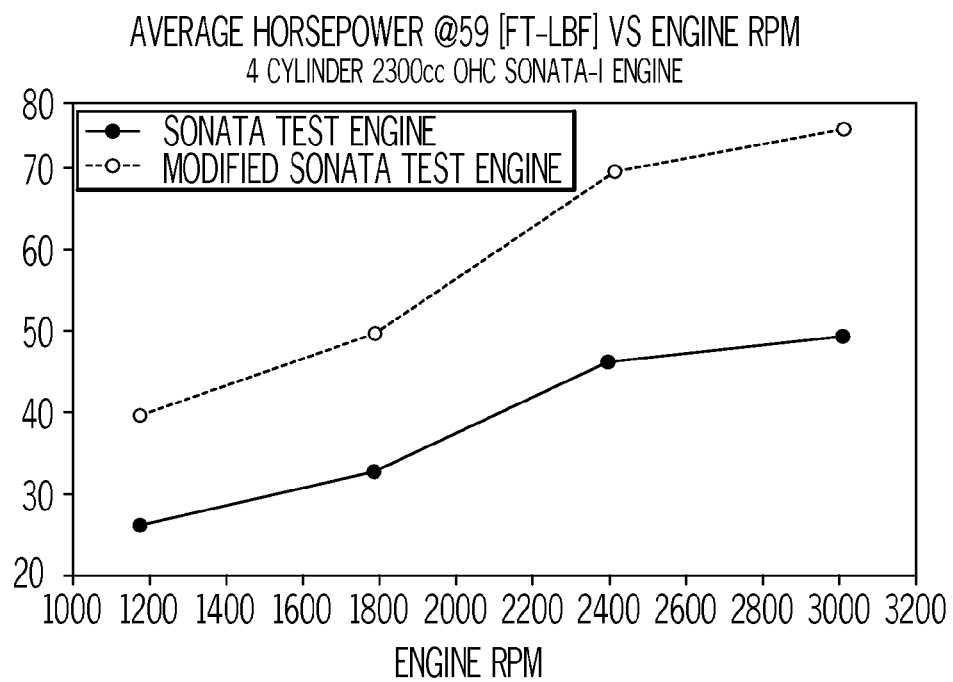

Additional calculations were also completed, which estimated the increased power and torque performance of the constant moment arm IC engine. For example purposes, the IC engine used for the calculations in both cases (e.g., a varying moment arm case and a constant moment arm case) is a Dual Over Head Cam (DOHC), 16 Valve, 4 cycle gasoline engine. In order to calculate predicted power and torque output for both cases, predetermined cylinder pressure curves for several different engine loads (as illustrated in FIG. 6) were taken and used in order to compare the varying moment arm and constant moment arm configurations using similar calculations to those used to prepare the torque tables of FIGS. 4 and 5. The pressure curves of FIG. 6 were taken from Martychenko, A., Park, J., Ko, Y., Balin, A. et al., *A Study on the Possibility of Estimation of In-Cylinder Pressure by Means of Measurement of Spark Gap Breakdown Voltage*, SAE Technical Paper 1999-01-1115 (1999), the contents of which is hereby incorporated by reference in their entirety. As detailed in Martychenko et al., the pressure curves are exemplary for a typical DOHC, 16 valve, 4 cylinder gas engine, so the calculations used to prepare torque and power estimates for the different engine loads were calculated using a piston bore (B) of 3.1693 inches and a piston stroke (S) of 3.1693 inches, which are typical examples for the type of DOHC, 16 valve, 4 cylinder gas engine detailed in Martychenko et al. (e.g., a 4 cylinder 2300 cc OHC Hyundai Sonata Engine). Torque and power output estimates were also calculated for a set engine load (e.g., 59 lbf-ft) across a range of engine speeds (i.e., rotational speed of the crankshaft).

Figure 15:
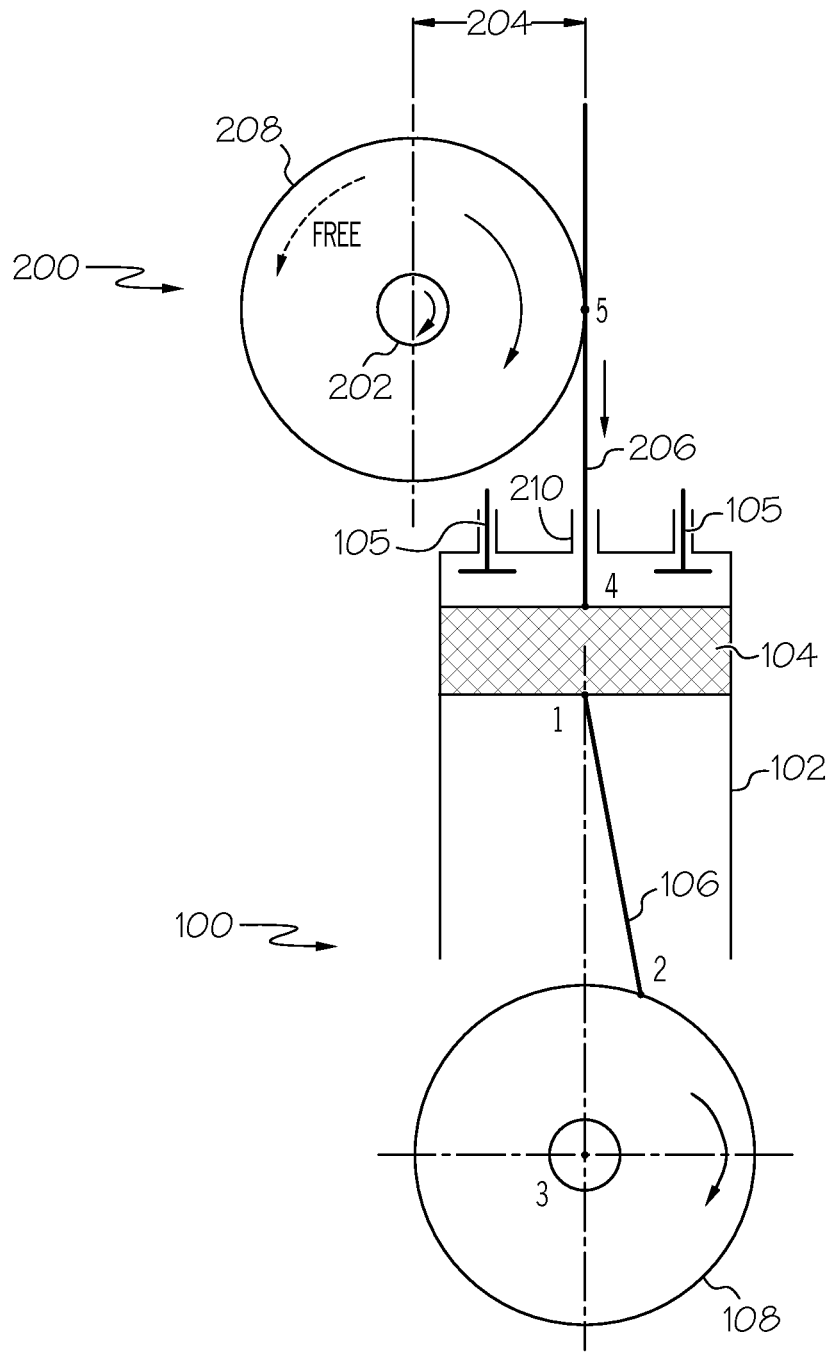
FIG. 15 is a schematic of an example reciprocating engine having a power delivery device having a constant moment arm to generate output torque.

To determine power output for the constant maximum length moment arm engine of this case where the moment arm (m)=crank radius (r)=½ the stroke (S/2), the reciprocating motion of the piston is converted into rotational motion of an output shaft. One exemplary general concept (e.g., implementation) that can be employed is depicted in FIG. 15. For each rotation of the crankshaft during which the connecting rod-to-crankshaft connecting point (2) (e.g., crank pin) travels π*S, the output shaft coupling point (5) (i.e., the point at which the pull rod, tension device, or similar component couples the piston to the clutch device (and therefore also to the output shaft)) only moves 2*S as the piston moves downward the distance of the stroke S and back upward the distance of the stroke S. While the examples herein are generally described as being only one cylinder for simplicity purposes, it is acknowledged that example engines having more than one cylinder will result the output shaft continuously rotating as each of the different pistons travel downward to generate motion of the output shaft. Thus, the rotational speed of the output shaft is proportionally lower than the rotational speed of the crankshaft. Therefore, to determine the steady state rotational speed of the output shaft for a consistent rotational speed of the crankshaft, the rotational speed of the crankshaft is multiplied by (2/π). It is noted that the piston momentarily stops moving in the vertical direction at both the top of the stroke (at top dead center (TDC)) and at the bottom of the stroke (at bottom dead center (BDC)) during the rotation of the crankshaft and quickly accelerates and decelerated between TDC and BDC as the crankshaft rotates. Therefore, the estimated speed of the output shaft can be equivalent (i.e., as influenced by the length of the moment arm (e.g., distance from the center of the output shaft to where the pull rod, tension device, or similar component is coupled to the clutch device)) to the average speed of the piston as it starts from 0 at TDC, accelerates to a maximum speed and then decelerates to 0 at BDC. As discussed above, the output shaft can typically continue to rotate when the piston moves upward from BDC to TDC. Therefore, while the piston moves upward (in an opposite direction of the rotation of the output shaft), the output shaft can continue to rotate, for example, at a speed that can be estimated using the average speed of the piston as it travels upward from BDC to TDC. That is, while the piston may reciprocate in two opposite directions, the speed of the output shaft can be estimated based on absolute average speed of the piston as it moves between BDC and TDC.

Further, in engines having only one cylinder, it is expected that devices, such as flywheel devices, can be used to maintain a portion of the rotational speed of the output shaft while the piston moves upward (i.e., and the movement of the piston is not directly applying rotational force to the output shaft).

The results of these calculations are illustrated in the plots of FIGS. 7-14. As illustrated, the estimated torque and power increases observed for the constant maximum length moment arm engine are generally proportionally larger for all of the calculated values. As discussed above, the rotational speed of the output shaft and the crankshaft are not generally the same, and the rotational speed listed in FIGS. 7-14 (e.g., 2400 RPM) is the rotational speed of the crankshaft (i.e., not necessarily the rotational speed of the output shaft).

In addition to the potential increases in torque and power discussed above, it is expected that the power delivery devices described herein having a constant maximum length moment arm can also be used to store energy (e.g., power) to be used when the engine is decelerating. For example, as detailed herein, a power delivery device can include an output shaft coupled to a reciprocating engine (i.e., reciprocating pistons of the engine) by a clutch device (e.g., a one way clutch) that permits the output shaft to rotate freely in one direction. That is, the clutch device can engage the output shaft only when the piston is in a downward motion. As mentioned above, this configuration helps permit the output shaft to rotate at different speeds than the crankshaft of the reciprocating engine to which the power delivery device is coupled.

In some aspects, the ability to rotate the output shaft at different speeds than the crankshaft enables the power delivery device to serve as a power storage device. For example, during use, the rotational speed of the crankshaft can be reduced by a user (e.g., as a result of engine deceleration) which would typically result in a reduction in power based on the reduced rotational speed. However, since the output shaft is typically able to rotate in one direction freely from the crankshaft, the output shaft need not decelerate when the crankshaft decelerates. Therefore, when the crankshaft decelerates, for example when the user decelerates the engines during use, the output shaft can be permitted to continue rotating at a higher rotational speed to continue generating power. As discussed below, the output shaft can include a flywheel that is useful to generate and maintain rotational momentum and motion of the output shaft.

In some cases, this configuration can be used in order to store or recapture energy during engine deceleration. For example, in some embodiments in which the reciprocating engine and power delivery device are used in an automobile, during deceleration of the crankshaft (e.g., as a result of letting off the accelerator pedal), the output shaft can continue to rotate to produce power (e.g., electrical or mechanical power) for use in other systems. Therefore, in some embodiments, devices including one or more of the power delivery devices described herein can be used as hybrid devices that can utilize both the power generated as a result of the reciprocating engine mechanically coupling and rotating the output shaft during a power stroke of the engine, as well as the stored energy (e.g., power) that can be made available by the continued rotation of the output shaft even when the engine decelerates or stops.

Additionally, in some embodiments, the output shaft can be connected to a coupling or a component of an automatic transmission (e.g., a torque converter of a transmission) so that the continued and consistent rotation of the output shaft (e.g., after the crankshaft has decelerated abruptly) can help provide consistent rotational speed and power to the automatic transmission. As mentioned above, such a coupling (e.g., a torque converter) can also be used to reduce the effects of the pulsing motion of the output shaft, which can result from the reciprocating motion of the piston that drives the clutch device.

Reciprocating Engine Having Constant Moment Arm

As discussed above, it is theoretically possible to extract more (e.g., significantly more) rotational kinetic power from the power stroke of a reciprocating piston by using a rotating powertrain (e.g., power delivery device) that is connected to the reciprocating pistons via a torque moment arm having a substantially consistent (e.g., constant) length (e.g., constant maximum length) throughout the power stroke. In some embodiments, a substantially consistent length torque moment arm can include a torque moment arm that is fixed at a set length which is its maximum length and allowed to vary only slightly from that fixed maximum value (e.g., constant, or invariant, or consistent). In some cases, the substantially consistent length moment arm can vary (e.g., slightly) as a result of contact regions moving along interfacing gears or between interfacing sprockets and chains.

For example, referring to FIG. 15, an example reciprocating engine 100 having a reciprocating element (e.g., a piston 104) connected to a rotatable crankshaft 108 via a connecting rod 106 and configured to translate up and down within a cylinder 102 and valves (e.g., intake and exhaust valves) 105 that control gas entering and exiting the cylinder 102. The engine 100 can be connected to a power delivery device 200 having a separate power output element (e.g., power output shaft 202) that is rotatably coupled to the piston 104 via the power delivery device 200 having constant length moment arm 204. The power output shaft 202 can be coupled to any of various devices that can utilize the rotational power including automotive drivetrains (e.g., drivetrains for cars, trucks, motorcycles, construction equipment (e.g., bulldozers) or other transportation devices, such as airplanes or boats), generators, welders, or other devices utilizing rotational power.

As illustrated, the power delivery device 200 can include an elongated translating tension device (e.g., a pull rod) 206 connected to the piston 104 such that as the piston 104 moves back and forth within the cylinder (e.g., up and down when the cylinder is vertically oriented, as shown in the example of FIG. 15), the pull rod 206 moves in the substantially same manner as the piston 104 (e.g., substantially the same travel distance, speed, acceleration, and produces substantially the same available axial force (e.g., force available to do external work) as the piston). The pull rod 206 could be connected at any desired location on the piston 104. That is, the pull rod could be secured to a region of the piston or connected to the wrist pin connecting the piston to the connecting rod. The pull rod 206 is typically configured to interface with other components of the power delivery device 200 that are attached to or integrated within the power output shaft 202. For example, in some examples as described below, the pull rod 206 can include a toothed rack (e.g., an elongated member having one or more rows of gear teeth) that is configured to interface and engage (5) with a rotatable member 208, such as a substantially round member (e.g., a gear device) of the power delivery device that is coupled to the output shaft 202. The portion of the engine that defines an opening 210 through which the pull rod 206 passes (e.g., pull rod opening) into cylinder (e.g., a cylinder head) typically includes a sealing device in order to limit (e.g., prevent) gas flow and pressure loss through an area between the opening and the pull rod.

Figure 16:
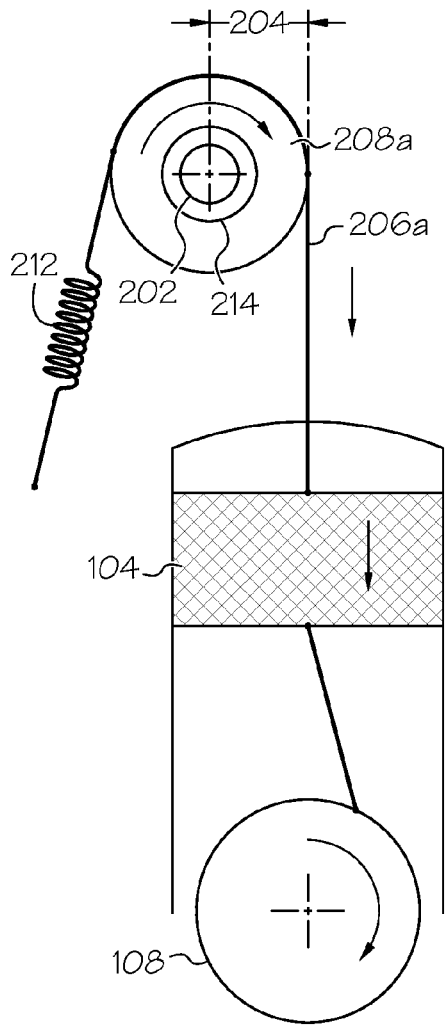
FIG. 16 is a side cross-sectional view another example reciprocating engine having a power delivery device having a flexible tension device (e.g., a cable) that is connected to a piston to generate power.
Figure 17:
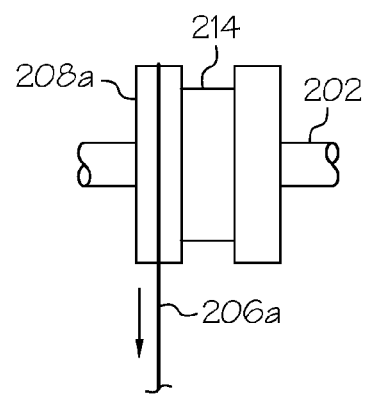
FIG. 17 is a front view of the power output delivery device of FIG. 16.
Figure 18:
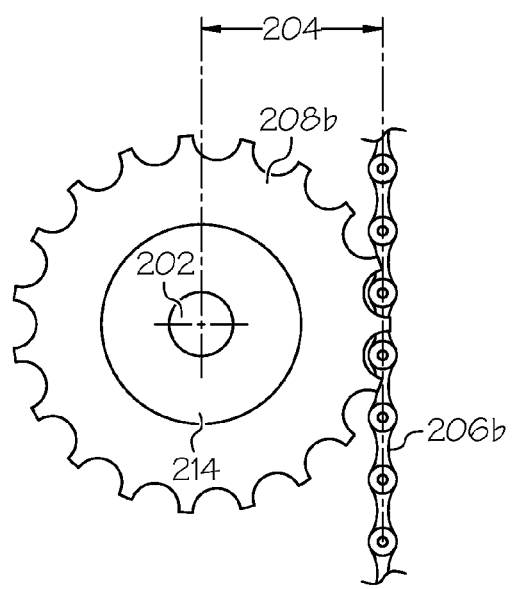
FIG. 18 is a side view of a power delivery device having a chain and sprocket system coupled to a power output shaft.

While the power delivery device that transfers the linear motion of the piston into the rotational motion of the power delivery device is generally described and illustrated as a single toothed rack that interfaces and engages with a gear device coupled to the output shaft, other configurations are possible. For example, in some embodiments, the power delivery device can include one or more additional gear sets used to increase or decrease rotational speed or torque of the output shaft based on the linear speed and force of the reciprocating piston. Additionally or alternatively, the power delivery device can include any of various devices or systems that can suitably transfer the linear motion of the piston into rotational motion of the output shaft while maintaining a substantially consistent (e.g., constant) length moment arm. For example, in some embodiments, the power delivery device (e.g., the rotatable member of the power delivery device) can additionally or alternatively include a belt system, a pulley system, and/or a chain drive system. In some cases, referring to FIGS. 16-18, one end of a tension device (e.g., a belt, cable 206a, chain 206b, or other device able to apply a tensile force) can be attached to a piston and the other end of the tension device can be connected to an output shaft using a pulley 208a or a sprocket 208b. A spring return mechanism 212 can also be included to help return the tension device (e.g., cable 206a, belt or chain 206b) upward as the piston 104 moves to the top of the stroke. In some embodiments, a power delivery device can include other types of power transfer systems including any of various devices.

Since the motion of the piston 104 alternates back and forth but it is generally desired to only rotate the output shaft 202 in one direction, the power delivery device 200 (e.g., the rotatable member 208 in some cases) is typically configured to engage the output shaft substantially in one direction (e.g., for a two cycle IC engine, only during the power stroke when the piston is moving downwardly as a result of the pressure increase caused by combustion within the cylinder) so that the output shaft only rotates in one direction. Note: for a four cycle engine, a clutch bearing power delivery device would be engaged both during an intake down stroke and a power down stroke but would still only allow rotation in one consistent direction.

In some embodiments, the power delivery device (e.g., the rotatable member of the power delivery device) is configured to grip the output shaft only when the tension device (e.g., pull rod, cable, or sprocket) is pulled into the cylinder by the piston and then substantially release the output shaft when the pull rod moves out of the cylinder as the piston returns to top dead center. In some embodiments, the power delivery device 200 includes a clutch device 214, such as a one-way clutch, that is configured to engage and rotate the output shaft only when the tension device moves into the cylinder but permits a rotating component of the power delivery device (e.g., the round gear device) to rotate freely relative to the output shaft in the opposite direction when the pull rod moves out of the cylinder to limit (e.g., prevent) the output shaft from inadvertently being alternatively rotated in a back and forth manner as the reciprocating piston moves within the cylinder. In some embodiments, the rotatable member can include a sprocket, a gear, a pulley, a wheel, a clutch device, or any suitable combination of one or more devices.

In some examples, as further discussed below, the clutch device 214 comprises a one-way freewheel clutch, a bearing clutch, such as a sprag clutch (e.g., a CSK model one-way bearing), or other similarly suitable one-way clutch devices. Clutch bearings can function as simple ball or roller bearings when rotated in one direction, and limit (e.g., prevent) rotation when turned in the opposite direction. This is sometimes accomplished by using spring-loaded sprags, which act as a wedge between the two bearing races. Clutch bearings are variously known as CSK bearings, one-way bearings, single direction bearings, and sprag bearings. The one-way clutch device can be spring-loaded to limit backlash as the output shaft is engaged. Alternatively or additionally, the clutch device can include a ratcheting mechanism, such as a ratchet clutch that enables the output shaft to be engaged substantially only when the power delivery device attempts to rotate the output shaft in one direction.

As illustrated, as a result of the interface between pull rod and the power delivery device being a generally consistent distance away from the rotational axis of the output shaft with respect to the axis of motion of the reciprocating piston (i.e., unlike the connection between the connecting rod and the crankshaft, as discussed above), the moment arm of the force that generates torque acting on the output shaft is substantially constant, steady or invariant.

As discussed above, this substantially consistent (e.g., substantially constant) length moment arm permits the extraction of increased (e.g., substantially increased) torque and power output via the output shaft driven by the pull rod than would otherwise be possible by extracting power from the crankshaft.

As a result of the substantially constant moment arm extraction of developed torque from the reciprocating engine, it is expected that the engine will convert the explosive energy of combustion into mechanical rotational motion more easily and that engine heat loses will be reduced and that the engine's overall thermal efficiency will be increased.

While the reciprocating piston engine illustrated still typically includes a crankshaft and connecting rods, which are used at least for returning the piston back to top dead center after the power stroke, it is expected that in some cases both the crankshaft and connecting rod can be reduced in size and structural integrity because these components are no longer used for transferring useable torque and power from the engine. Such a reduction in size of the crankshaft and connecting rod may be expected to help reduce the amount of parasitic power loss that could otherwise result from the additional rotating mass in the engine.

The example reciprocating engine illustrated in the schematic of FIG. 15 can be carried out in any of various suitable configurations and designs. As mentioned above, an engine (e.g., an IC engine) can be designed specifically to include the separate power delivery device and power output shaft by which the power generated by the reciprocating pistons can be extracted. Such specially designed engines can include reduced crankshafts and connecting rods in order to limit power loss that could result from the rotating mass.

EXAMPLE IMPLEMENTATIONS

In some embodiments, an existing engine (e.g., an existing IC engine) can be modified to include a separate power delivery device and power output shaft by which the power generated by the reciprocating pistons can be extracted. For example, FIGS. 19-23 illustrate a modified four cylinder engine 300, which is modified to include the separate power delivery device 400 and power output shaft 402. It is noted that the crankshaft, connecting rods, several gas seals, and other parts of the engine are omitted from the figures for clarity.

As illustrated, the modified IC engine is a dual-over-head-cam (DOHC) four cylinder, four cycle, In-Line gasoline powered engine (e.g., a modified Toyota Model 3RZ-FE gasoline engine). For multiple cylinder reciprocating engines (e.g., IC engines) it is generally desirable to have a single power output shaft, therefore a simple expected configuration includes one where the pistons and cylinders are in line with one another so that the power delivery device of each piston and cylinder can be configured to a single power output shaft. For the four cycle IC engine there is one power stroke every two revolutions of the crankshaft. Therefore, for the four cylinder four cycle IC engine there is a power stroke every 180 degrees rotation of the crankshaft. For a six cylinder IC Engine there is a power stroke every 120 degrees of crankshaft rotation and for an eight cylinder IC engine every 90 degrees of rotation. A single power output shaft of the above described In-Line IC engines, whether 4, 6, or 8 cylinders, is desirable. Although it may be desirable to have a single power output shaft, all of the benefits of increased torque and power of this constant torque arm invention apply to reciprocating engines of all power cycles and all mechanical configurations (e.g., V6, V8, V12, Radial, etc.). In mechanical configurations of multiple cylinder engines that are not 'in-line' there may be multiple power output shafts. Additionally, in some embodiments, V-style engine configurations can be coupled to a power delivery device having a single output shaft. That is, even in the case of engines having pistons and cylinders that are not all in-line with one another, tension devices connected to the pistons can be coupled to a common output shaft using any of various gearing or pulley configurations to cause consistent rotation of the output shaft.

In a DOHC In-Line IC engine the area above the piston and cylinder centerline is more or less unobstructed with various engine parts, making it easier for the addition of a power delivery device which is attached to the piston and travels up through the cylinder head. As illustrated, the power delivery device 400 can include two pull rods 406 for each cylinder that are coupled to a piston (e.g., via the existing piston pin used to couple the piston to the connecting rod). In the example shown, two pull rods 406 are used (e.g., one on each opposite side of the piston) in order to balance the load on the piston 304 and may also reduce the load exerted on each pull rod 406. In some IC engine designs, the connecting rod is connected to the piston slightly off-axis of the piston centerline. The pull rods 406 are disposed through an opening 410 on a component of the engine (e.g., the cylinder head 302) and are configured to move up and down through the opening 410 with the motion of the piston. Note that in the example four cylinder, four cycle reciprocating engine shown in FIG. 19-22, two of the pistons can be configured to move in the same direction at all times, exactly 180 degrees apart from the other two pistons. As one cylinder fires in a power stroke, driving that piston downwardly into the cylinder, all four pull rods of the two pistons moving together will share the driving load of the power stroke.

Figure 19:
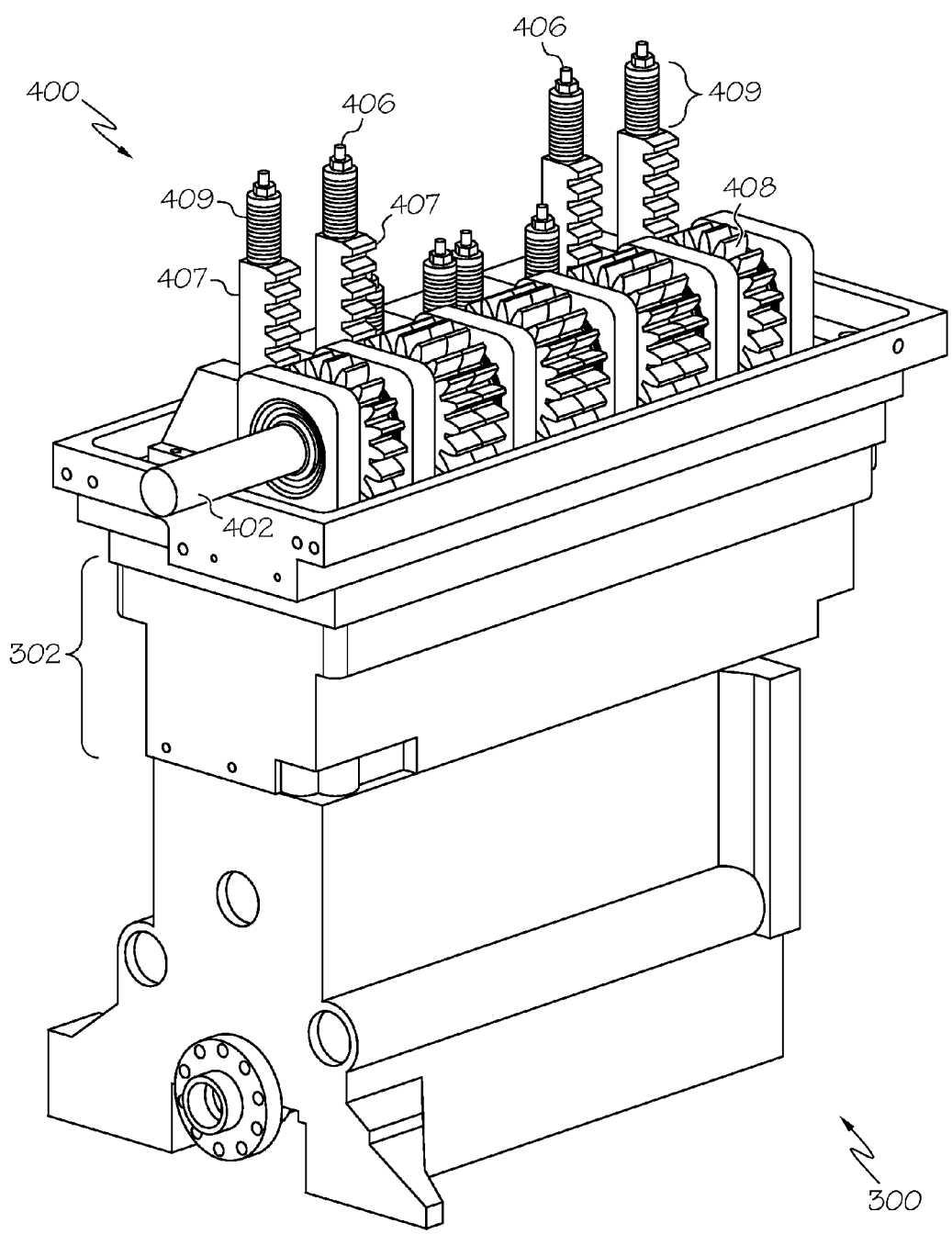
FIG. 19 is a perspective view of another example of a power delivery device that generates output torque using a constant moment arm mounted onto a reciprocating piston engine.
Figure 20:
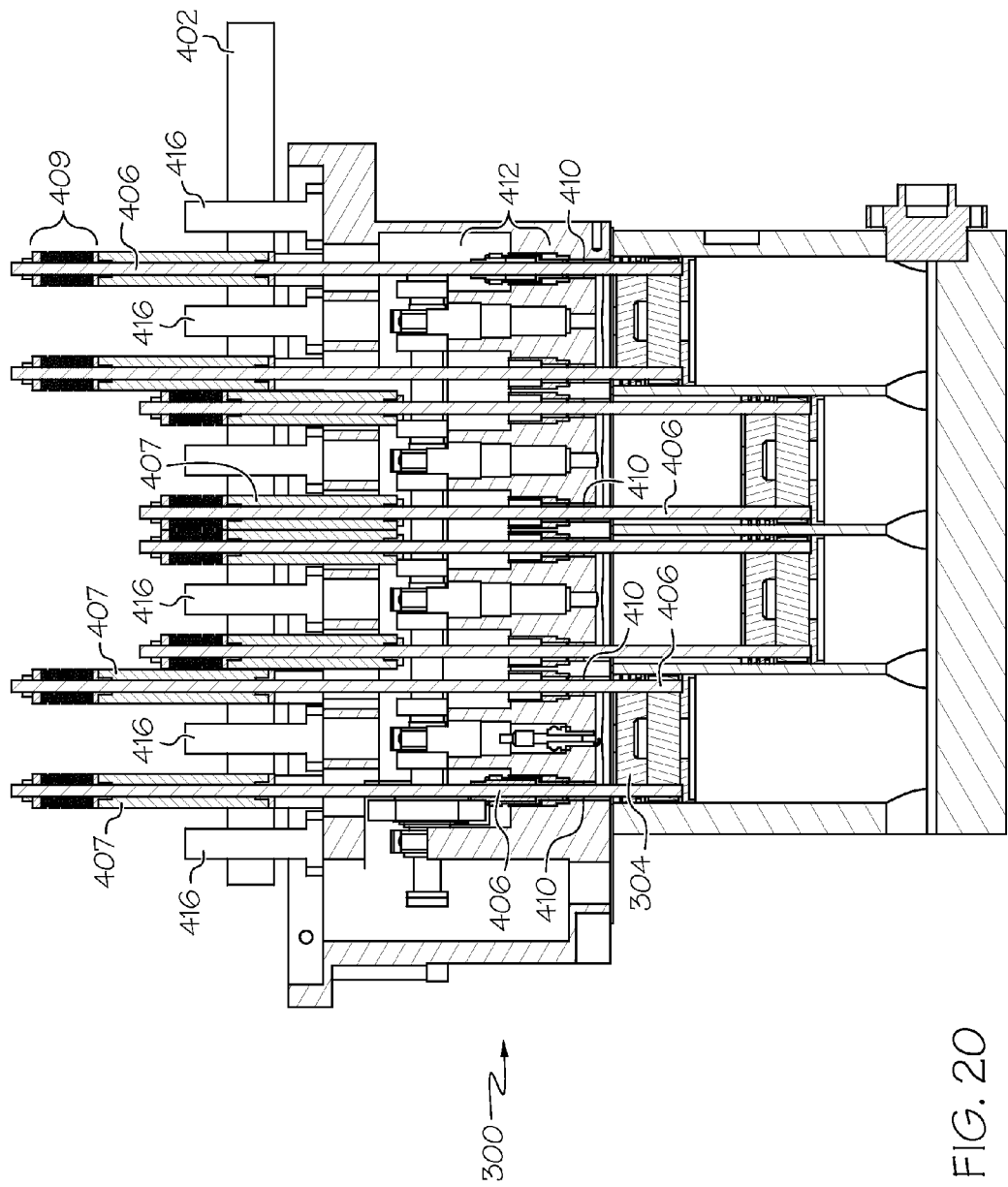
FIG. 20 is a cross-sectional front view of the power delivery device and reciprocating piston engine of FIG. 19.
Figure 21:
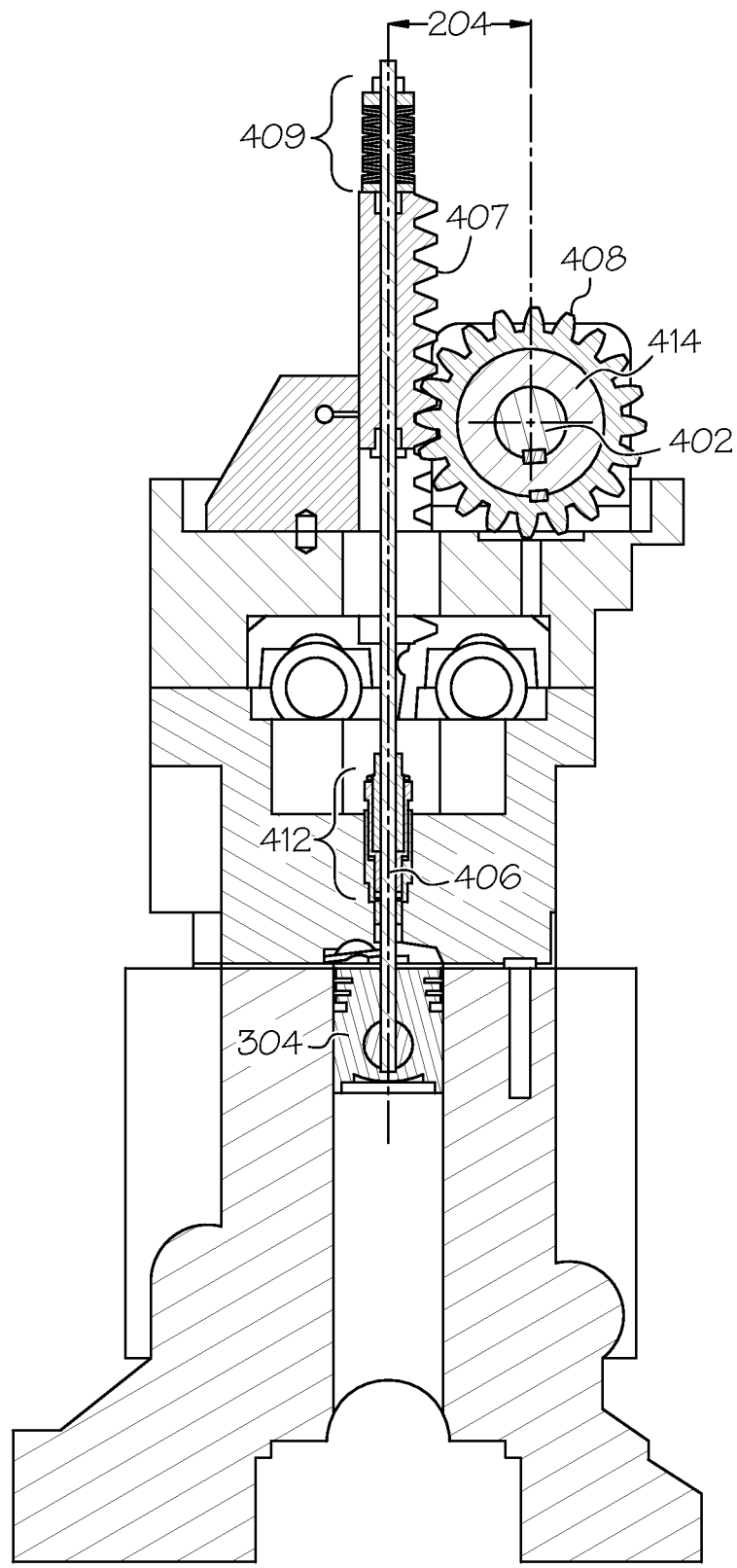
FIG. 21 is a cross-sectional side view of the power delivery device and reciprocating piston engine of FIG. 19 illustrating a seal assembly to limit pressure loss from the engine cylinder and an energy storage device coupled between a pull rod and a gear rack of the power delivery device.
Figure 22:
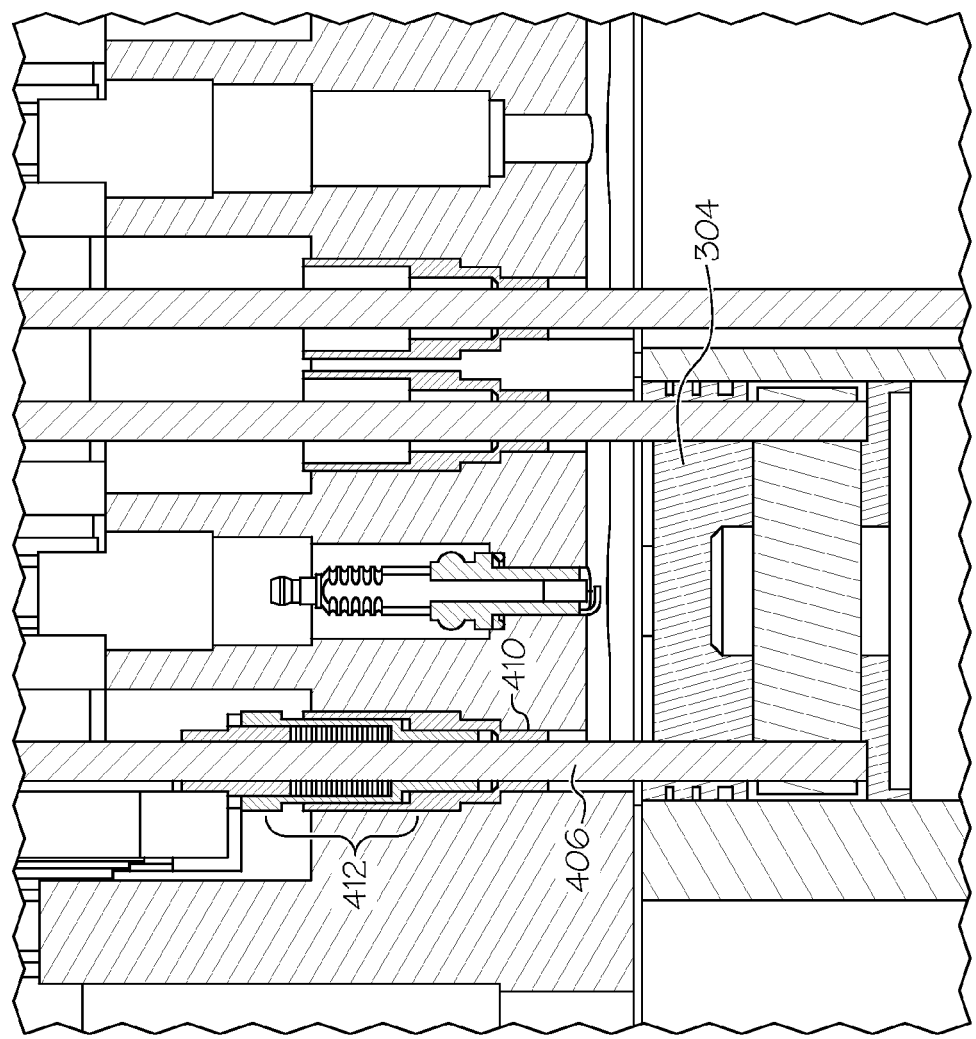
FIG. 22 is an enlarged cross-sectional view of the engine of FIG. 19 illustrating pull rods of the power delivery device coupled to a reciprocating piston.
Figure 23:
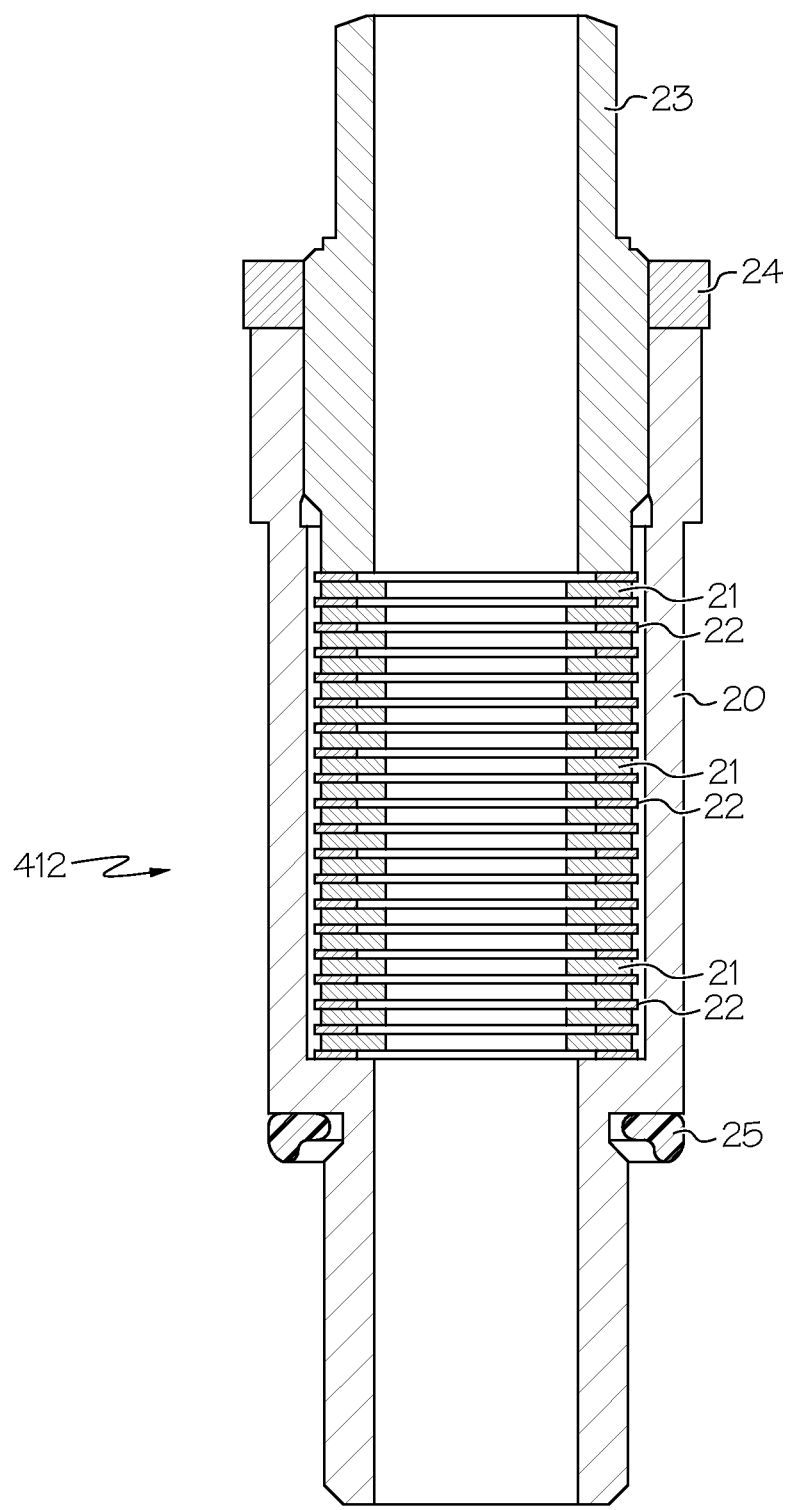
FIG. 23 is a cross-sectional view of a sealing device that can be used to limit gas pressure loss from a combustion chamber.

In some embodiments, the pull rods 406 include a toothed gear rack 407 that is coupled to an upper region of the pull rod. In some embodiments, the gear rack 407 can be coupled to the pull rod 406 so that the gear rack 407 can move slightly along, and independently to, the pull rod. In some cases, as illustrated, the gear rack can be attached to the pull rod using one or more spring elements (e.g., Belleville style springs) 409, which can help perform several functions. For example, the springs can act as an energy storage device 409 for the power delivery device. As discussed above and illustrated in FIG. 2, the pressure within the cylinder (and therefore also the force acting on the piston) typically has a distinct spike very early during the power stroke and then quickly decays as the piston travels into the cylinder. Therefore, the springs that couple the gear racks to the pull rods as illustrated in FIGS. 19-21 can compress to absorb a portion of the initial load as the pressure spikes (which would cause the pull rods to move downward slightly relative to the gear racks), storing energy in the compression of the springs. Then, as the piston moves into the cylinder and the pressure decays, the spring can expand to force the gear rack back down against the pull rod, releasing the stored energy. Such compression and expansion of the spring can help to distribute the force spike seen by the piston near Top Dead Center. Figuratively, this can act to slightly smooth the pressure curve and distribute some of the forces throughout the piston power stroke. Additionally or alternatively, the springs can also help limit shock that could be generated as the reciprocating piston translates back and forth.

Alternatively, the gear rack can be permanently fixed to the pull rod (e.g., via fasteners or by being integrally formed into the pull rod). The gear rack is sized and configured to engage and couple to a rotating member (e.g., a substantially round gear 408), which is coupled to the output shaft 402 in order to rotate the output shaft. As discussed above, the toothed gear 408 is typically coupled to the output shaft 402 using a clutch (e.g., a one-way clutch bearing 414) in order to transfer the reciprocating linear motion of the pull rods into a substantially one-way only rotational motion.

As shown, in some embodiments, the output shaft is coupled to the engine (e.g., the cylinder head) using mounting devices (e.g., bearing carriers 416) that position the output shaft but permit it to rotate under torque generated by the power delivery device.

Referring specifically to FIGS. 20-23, the cylinder head 302 includes a sealing member (e.g., a seal, such as a labyrinth seal) 412 that is able to limit pressure loss through the opening 410 through which the pull rod 406 travels while providing an adequate clearance so that the pull rod 406 can move freely through the sealing member 412. As illustrated in the enlarged view of FIG. 23, the labyrinth seal assembly 412 includes a generally cylindrical main body 20 housing a series of sealing disks 21 that are separated from one another by disk spacers 22. The labyrinth seal assembly 412 also includes a clamping plug 23 to retain the sealing disks 21 and the disk spacers 22 within the main body 20. A jam nut 24 can be used to couple the clamping plug 23 to the main body 20. A cylinder gasket 25 can be positioned at an end of the seal assembly 412 (e.g., at an end configured to be inserted into the engine cylinder) to help seal the cylinder.

The inner diameter of the sealing disks 21 can be configured to be only slightly larger than the pull rod diameter. The inner diameter of the disk spacers 22 can be larger than the inner diameter of the sealing disks 21 by several multiples of the gap distance between the pull rods and seal disk inner diameter to create a cavity between sealing disks. The series of created cavities between sealing disks 21 can create a large resistance to gas flow where the more cavities formed can increase resistance to flow. The disk spacers 22 can be made somewhat compliant to compensate for a tendency of the seal to become loose. Alternatively, a separate compliant part (e.g., a spring) could be added to the stack.

In some embodiments, the power delivery device having a substantially steady or constant moment arm to generate increased torque and power can be included as part of an engine modification kit (e.g., engine retrofit kit) that can be installed onto an engine for use. For example, in some embodiments, the pistons and top end of an engine (e.g., the cylinder head and valve train) can be replaced in order to install the separate power delivery device and power output shaft onto an existing engine. Such a modification kit could be used as a method for increasing the output torque and power of an existing engine.

While the power delivery devices have generally been described as having a consistent (e.g., constant or invariant) length torque moment arm which has a consistent (e.g., constant or invariant) length that is at its maximum, non-changing length throughout the power stroke, some variation in moment arm length is possible. For example, in some embodiments, the power delivery device (e.g., the rotating member or the interfacing portion of the pull rod) is configured so that the moment arm acting on the output shaft is not perfectly constant at its maximum value. In some cases, the moment arm length varies slightly as the tension device translates and interfaces with the rotatable member. For example, the moment arm can vary slightly as the gear rack interfaces with a rotating pinion gear or as a chain interfaces with a rotating sprocket.

A typical maximum moment arm length for conventional reciprocating engines would be the crankshaft radius or half the engine stroke; however, this may vary for various engine designs. Because conventional reciprocating engines typically have a torque moment arm length that varies from 0 length (at crankshaft angles of 0 degrees and 180 degrees ATDC) to its maximum length (at a crankshaft angle of 90 degrees ATDC), any moment arm length that varies less than this range (i.e., 0 to maximum) is expected to be an improvement for torque generation. For example, in some cases, the consistent length moment arm devices described herein can vary from about 0% to about 50% change in length (e.g., about 0% to about 40%, about 0% to about 30%, about 0% to about 20%, about 0% to about 15%, about 0% to about 10%, about 0% to about 5%, about 0% to about 2%, about 0% to about 1%, about 0% to about 0.5%, about 0% to about 0.1%, about 0% to about 0.0001%) as the pull rod reciprocates with the pistons and an improvement would be realized and noticed.

It is noted that these descriptions and geometric relationships are generally described herein for a substantially vertically aligned cylinder arranged above the centerline (e.g., axis) of the crankshaft. However, the principles described herein can also be implemented using differently configured reciprocating engines. That is, the equations presented herein that are used to describe the differences between extracting power from a crankshaft and extracting power from a separate power delivery device (e.g., drivetrain) having a constant length moment arm can be adjusted or updated based on a particular engine configuration, but the increased output of the constant moment arm engine is expected to observed with the differently configured engines.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A method of extracting mechanical work from an operating reciprocating engine comprising a rotating crankshaft, a cylinder, a cylinder head, a connecting rod, a reciprocating piston assembly having a wrist pin end and a combustion pressure chamber end connected via the connecting rod at the wrist pin end of the reciprocating piston assembly to the crankshaft and configured to reciprocate within the cylinder with a rotation of the crankshaft, a translating tension member connected to the reciprocating piston assembly at the combustion pressure chamber end of the reciprocating piston assembly that is opposite the wrist pin end, a combustion chamber defined by the cylinder, the cylinder head, and the combustion pressure chamber end of the piston assembly, and an output shaft that is configured to rotate via a movement of the translating tension member and to rotate independently of the rotation of the rotating crankshaft, the method comprising:

applying a torque moment to the output shaft of the reciprocating engine using an axial pulling force provided by the translating tension member moving through the combustion chamber in a first direction power stroke with a torque moment arm that remains a substantially constant length as the translating tension member of the engine translates within the combustion chamber and the output shaft rotates; and disengaging the output shaft from the translating tension member as the reciprocating element travels through the combustion chamber in a second direction that is substantially opposite the first direction so that the output shaft can rotate independently of the rotation of the rotating crankshaft.

2. The method of claim 1 wherein the substantially constant length is substantially the same as a crankshaft radius of the crankshaft of the reciprocating engine.

3. The method of claim 1 wherein the using the torque moment arm comprises coupling the translating tension member of the engine to the output shaft using a substantially constant length moment arm.

4. The method of claim 1 wherein the extracting mechanical work further comprises increasing an output power of the reciprocating engine by applying the torque moment using the torque moment arm that remains a substantially constant length.

5. The method of claim 1 wherein the torque moment arm comprises a moment arm that remains at its maximum length throughout a rotation of the output shaft.

6. The method of claim 3 wherein the coupling the translating tension member of the engine to the output shaft comprises coupling the output shaft to a rotating member defining the substantially constant length torque moment arm, the rotating member configured to interface with the translating tension member of the engine.

7. The method of claim 1 wherein the engine is an internal combustion engine.

8. The method of claim 1 wherein the translating tension member comprises a pull rod coupled to the reciprocating element at the first end of the reciprocating element, wherein the pull rod can couple to the output shaft using the torque moment arm that remains a substantially constant length.

9. The method of claim 1 wherein the torque moment arm is substantially perpendicular to a reciprocating axis of the translating tension member to apply torque to the output shaft.

10. The method of claim 1 wherein the torque moment arm that remains a substantially constant length is defined by a rotatable gear device coupled to the output shaft and a gear rack coupled to the translating tension member.

11. A reciprocating engine comprising:
a rotating crankshaft;
a cylinder;

a cylinder head;
a connecting rod;
a reciprocating piston assembly having a wrist pin end and a combustion pressure chamber end connected via the connecting rod at the wrist pin end to the crankshaft and configured to reciprocate within the cylinder with a rotation of the crankshaft;
a combustion chamber defined by the cylinder, the cylinder head and the pressure chamber end of the piston assembly;
a translating tension element connected to the reciprocating piston assembly at the combustion pressure chamber end of the reciprocating piston assembly that is opposite the wrist pin end, the translating tension element translating through the combustion chamber; and
an output shaft that is configured to rotate as a result of a pulling force provided by the translating tension member, moving through the combustion chamber in a first direction power stroke, the output shaft being configured to rotate independently of the rotation of the crankshaft, the output shaft being coupled to the translating tension element via a clutch device defining at least one substantially invariant length torque moment arm that remains substantially constant during reciprocation of the translating tension element and a rotation of the output shaft of the engine, the clutch device being configured to disengage the output shaft from the translating tension element as the translating tension element travels through the combustion chamber in a second direction that is substantially opposite the first direction.

12. The reciprocating engine of claim 11 wherein the substantially invariant length torque moment arm has a length equivalent to a crankshaft radius of the crankshaft of the engine.

13. The reciprocating engine of claim 11 further comprising a device to convert a reciprocating motion of the translating tension element of the engine into a rotational motion of the output shaft using the substantially invariant length torque moment arm.

14. The reciprocating engine of claim 11 wherein the substantially invariant length torque moment arm is defined at least in part by an interfacing region between a rotating device coupled to the output shaft and the translating tension element coupled to the reciprocating piston assembly.

15. The reciprocating engine of claim 14 wherein the rotating device comprises at least one of a pulley, a gear, or a sprocket.

16. The reciprocating engine of claim 14 wherein the translating tension element comprises at least in part one of a cable, a chain, a belt, a pull rod, or a gear rack.

17. The reciprocating engine of claim 14 wherein the clutch device is disposed between the output shaft and the rotating device.

18. The reciprocating engine of claim 11 wherein the substantially invariant length torque moment arm comprises a torque moment arm that generates the torque: i) being defined between a rotational axis of the output shaft and a contact point between the translating tension element and a rotatable member; ii) being generally orthogonal to a motion of the translating tension element; and iii) remaining a substantially constant length during translation of the translating tension element of the engine.

19. The reciprocating engine of claim 11 further comprising an energy storage device, disposed along a mechanical connection between the reciprocating piston assembly and the output shaft, to temporarily store energy produced by a sudden pulling force of the translating tension element by movement of the reciprocating piston assembly of the engine during a power stroke and subsequently release the stored energy to the output shaft as the reciprocating piston assembly travels within the engine.

20. A power delivery device to couple to a reciprocating element of a reciprocating engine comprising a crankshaft; at least one cylinder, at least one cylinder head, at least one connecting rod; and at least one reciprocating element connected at a wrist pin end to the crankshaft that reciprocates with a rotation of the crankshaft, the at least one reciprocating element having a combustion pressure chamber end opposite the wrist pin end; and a combustion chamber defined by the cylinder, the cylinder head and the combustion pressure chamber end of the piston assembly, the power delivery device comprising:
an axially translating tension member, connected at the combustion pressure chamber end of the at least one reciprocating element, to couple to and translate with one of the at least one reciprocating element, the translating tension member translating through the combustion chamber in a first direction and through the combustion chamber in a second direction that is substantially opposite the first direction; and
a rotatable member coupled to a power output element via a clutch device defining a substantially constant length torque moment arm and interfacing with the translating tension member, the power output element being configured to rotate independently of the rotation of a crankshaft of the reciprocating engine, the translating tension member providing an axial pulling force to the rotatable member that applies a torque to the power output element during an axial power stroke motion of the translating tension member through the combustion chamber when the one of the at least one reciprocating element travels in the first direction, and the clutch device being configured to disengage the power output element from the rotatable member when the one of the at least one reciprocating element travels in the second direction through the combustion chamber.

21. The power delivery device of claim 20 wherein the torque moment arm that generates the torque: i) is defined between a rotational axis of the power output element and a contact point between the translating tension member and the rotatable member; ii) is generally orthogonal to the motion of the translating tension member; and iii) remains a substantially constant length during reciprocation of the reciprocating element.

22. The power delivery device of claim 20 wherein the rotatable member is coupled to the output element using the clutch device configured to permit the rotatable member to freely rotate relative to the power output element in the second direction.

23. The power delivery device of claim 20 wherein the rotatable member comprises a gear device and the translating tension member comprises a gear rack that interfaces with the gear device.

24. The power delivery device of claim 20 wherein:
the reciprocating element comprises a reciprocating piston assembly;
the power output element comprises a rotating power output shaft other than the crankshaft of the engine;
the translating tension member comprises a pull rod device to connect to the reciprocating piston assembly and translate based on a reciprocating motion of the piston assembly;
the clutch device comprises a one-way clutch;
and the power deliver device further comprises:

a linear gear device coupled to the pull rod to translate with the pull rod; and a rotatable pinion gear coupled to the output shaft and configured to interface with the linear gear device;

wherein the one-way clutch device is disposed between the output shaft and the pinion gear to engage the output shaft when the pinion gear rotates in a first direction of a piston assembly motion towards a crankshaft by which it rotates; and wherein a distance between a rotation axis of the output shaft and a contact region between the linear gear device and the pinion gear remains substantially constant as the piston assembly reciprocates in the engine.

25. A reciprocating engine comprising a crankshaft and at least one piston assembly and cylinder, the at least one piston assembly translating in a first direction and a second direction substantially opposite the first direction and being connected at a first end to the crankshaft via a connecting rod and additionally connected at a combustion pressure chamber end of the piston that is opposite the first end to an output shaft, that is configured to rotate independently of a rotation of the crankshaft, via a clutch device defining substantially invariant length torque moment arm, and a combustion chamber defined by the cylinder, the cylinder head and the combustion pressure chamber end of the piston assembly, the engine comprising:

an axially translating tension element to couple to and translate through the combustion chamber with the reciprocating piston assembly; and a rotatable member coupled to the output shaft via the clutch device and interfacing with the translating tension element, the translating tension element providing an axial pulling force to the rotatable member that applies a torque to the output shaft during an axial motion of the translating element through the combustion chamber when the piston assembly translates in the first direction, the clutch device being configured to disengage the rotatable member from the output shaft when the piston assembly translates in the second direction, the substantially invariant length torque moment arm: i) being defined between the rotational axis of the output shaft and an interface region between the translating tension element and the rotatable member; and ii) being generally perpendicular to the motion of the translating element.

26. The engine of the claim 25 wherein the first direction of the piston assembly is inward towards the crankshaft and the second direction of the piston assembly is outward away from the crankshaft.

27. The engine of claim 25 wherein the rotatable member comprises a gear device and the axially translating tension element comprises a tension device to engage the gear device.

28. The engine of claim 25 wherein the clutch device is disposed between the rotatable member and the output shaft.

29. The engine of claim 25 wherein the engine is an internal combustion and the at least one piston assembly and cylinder comprises four in-line piston assemblies and cylinders, each of the piston assemblies being configured to engage and rotate the output shaft via a substantially invariant length torque moment arm.

* * * * *